US007337950B2

(12) United States Patent
DeVault

(10) Patent No.: US 7,337,950 B2
(45) Date of Patent: Mar. 4, 2008

(54) TRANSACTION WORKFLOW AND DATA COLLECTION SYSTEM

(76) Inventor: Ricky W. DeVault, 14112 W. 54th St., Shawnee, KS (US) 66216

( * ) Notice: Subject to any disclaimer, the term of this patent is extended or adjusted under 35 U.S.C. 154(b) by 279 days.

(21) Appl. No.: 10/900,798

(22) Filed: Jul. 28, 2004

(65) Prior Publication Data
US 2005/0027651 A1    Feb. 3, 2005

Related U.S. Application Data

(60) Provisional application No. 60/491,630, filed on Jul. 28, 2003.

(51) Int. Cl.
*G06F 7/00* (2006.01)
(52) U.S. Cl. ............... 235/376; 235/379; 235/380; 705/38; 705/39
(58) Field of Classification Search ........... 235/376, 235/379, 380; 705/75, 38, 39, 35, 42, 44
See application file for complete search history.

(56) References Cited

U.S. PATENT DOCUMENTS

| | | | |
|---|---|---|---|
| 5,699,527 A | 12/1997 | Davidson | |
| 6,073,109 A * | 6/2000 | Flores et al. | 705/8 |
| 6,105,007 A | 8/2000 | Norris | |
| 6,225,998 B1 * | 5/2001 | Okita et al. | 715/853 |
| 6,243,092 B1 * | 6/2001 | Okita et al. | 715/866 |
| 6,347,307 B1 * | 2/2002 | Sandhu et al. | 705/36 R |
| 6,446,048 B1 * | 9/2002 | Wells et al. | 705/35 |
| 6,615,258 B1 * | 9/2003 | Barry et al. | 709/223 |
| 6,904,412 B1 * | 6/2005 | Broadbent et al. | 705/38 |
| 2002/0040304 A1 * | 4/2002 | Shenoy et al. | 705/1 |
| 2002/0103906 A1 | 8/2002 | Knight et al. | |
| 2002/0138321 A1 * | 9/2002 | Yuan et al. | 705/8 |
| 2003/0200168 A1 * | 10/2003 | Cullen et al. | 705/37 |

* cited by examiner

*Primary Examiner*—Uyen-Chau N Le
(74) *Attorney, Agent, or Firm*—Mark E. Brown

(57) ABSTRACT

A transaction workflow and data collection system including the steps of configuring multiple user profiles and system-wide loan data policies, process the loan transaction using a workflow system during which loan data is collected and validated using the system-wide loan data policies and communicating the validated loan transaction data to third-party systems. This Abstract is provided only for searching purposes as required by the U.S.P.T.O., and is not intended to narrow the scope of the present invention as defined by the attached claims in any way.

11 Claims, 27 Drawing Sheets

Fig. 8

COLUMN OPTIONS

Loans Work Queue

Where: Loan Amount between $100,000.00 and $2,000,000.00 AND Status = Incomplete or Rejected or Docs Working or Docs Ready

Column Options

| Field Name | Select | Display Order | Filter | Filter Order | Sort | Sort Priority | Sort Direction |
|---|---|---|---|---|---|---|---|
| Customer | X | 1 | X | 1 | X | 1 | Ascending |
| SSN / TIN | X | 2 | | 2 | | | |
| Cust Number | X | 3 | X | 3 | X | | |
| Loan | X | 4 | | 4 | | | |
| Loan Amount | X | 5 | X | | X | 2 | Descending |
| Loan Date | | 6 | X | | | | |
| Cost Ctr | | | | 7 | | | |
| Date Needed | X | 10 | X | 5 | | | |
| Status | X | 7 | X | 6 | | | |
| Approval Status | X | 8 | | | | | |
| Lender | | 9 | | | | | |
| Associate Lender | X | 11 | | | | | |

< Apply >   < Save >   < Cancel >   < Filter Options >   < Exit >   < Help >

*Fig. 9*

APPLICATION FRAME SCREEN

*Fig. 11*

EMPLOYEE TYPE FIELD

TRANSACTION WORKFLOW AND DATA COLLECTION SYSTEM

CROSS-REFERENCE TO RELATED APPLICATION

This application claims the benefit of U.S. provisional application No. 60/491,630 filed Jul. 28, 2003, which is incorporated herein by reference.

BACKGROUND OF THE INVENTION

1. Field of the Invention

The present invention relates generally to an automated transaction system and in particular to a workflow management system and data collection system for a transaction based system.

2. Description of the Related Art

Processing commercial transactions is a complicated process involving organizations as customers, institutional-wide policies and numerous tasks that must be completed by various departments within banks, hospitals, warehouses, manufacturing facilities or other industrial, commercial, financial, health care or government institutions. Such tasks include inventory control, pharmaceuticals, commercial loans, verifying data, evaluating risks and approving and administering transaction based decisions.

These tasks are generally performed by multiple computer applications performing specific functions in the life-cycle of the transaction. For example, documentation systems prepare documents, accounting systems manage payments, collateral tracking systems follow collateral and compliance systems prepare governmentally required reports.

Business processes are often characterized by the need to have different people or departments perform work on various pieces of the same business data at different points in the process. Each individual person or department has different responsibilities for the transaction and therefore may need access to different aspects of the transaction. Current systems allow a user to search the transaction using different criteria, including customer number, social security number, transaction id, including combinations thereof. These searches are usually performed at the start of a process and each time the user returns to the system. It would be beneficial to have a system which filtered the transactions based upon the user's responsibilities upon access to the system.

One method currently used to address this issue is to allow the user to define a specialized view of a set of data and build a custom report based on that data. For example, a user might want to find all transactions with a value over $1 million dollars because the user must approve those transactions. Current transaction systems may be able to provide that information. However, the user simply wanted to know what transactions needed his approval, current systems would have difficulty providing that type of information. In another example a clerk may be able to prepare loan documents based upon loan transaction information; however, the document preparation system does not instruct the clerk which loan transactions need to have documents prepared. The current method does not allow the user to select a subset of data relevant to the user. It would be beneficial to create a system which integrated the user and institutional information and instructed the user which transactions needed to be processed, allowing the user to perform the actual task that is within his area of responsibility.

In addition, it would be helpful to add a functional menuing system with relevant or desired functional features. This would allow the users to perform functional tasks from their display screens. It would also be of further benefit to allow the user to quickly and automatically navigate to a specific data field within the transaction-based system through an auto-navigation feature.

As described above, the institutional transaction process being a transaction-based system involves a number of different systems and individuals performing a specific task on the transaction at any given time. Because of the diversity of systems used in the institutional process, a user must educate himself on using the various systems as well as where within each system a specific item may be located. With the complexity of these systems, it is often difficult to remember specifically where an item is within the system, and the user is required to spend non-productive time trying to locate the item. It would be beneficial to create a single point of entry for a user to organize the various resources he interacts with and simplify the job of executing each task that routinely arises. In addition, it would be helpful if the single point of entry was customizable to each individual user allowing him to see the items which may be of most importance to him.

As previously mentioned, some financial institutions have applications specifically designed for individual aspects of the lending process, with a fixed, hard-coded menuing system. In addition to the confusing, inconsistent graphical interfaces between the different systems, when a new screen or function is added additional programming is required to modify menus and system navigation logic. The result is a confusing user interface for users to operate and a system with higher maintenance costs because of its inflexibility. It would be beneficial to have an integrated, interactive graphical user interface which provides a predictable screen structure, imposing parent-child screen relationships, auto and manual navigational elements, security and functional features which are utilized consistently throughout the transaction.

During the life cycle of a institutional transaction, a transaction requires interaction from a number of different individuals and various departments throughout the institution, each with their own level of authority, responsibilities and access to data to coordinate the necessary approvals and numerous documents involved in the process. As the transaction travels through the institutional process system, it moves from department to department and then back again. In this way work may be assigned to a supervisor based upon geographic factors, or to a team member based upon department organization. Furthermore, each employee must have valid authorization to review and/or perform his job specific functions on the transaction. It would be beneficial to represent the institution's organizational hierarchy within a transaction-based system in order to control access to application data and application functions as well as work assignments and additional system related features.

As described above, transaction process system in use today are comprised of various software systems which have a variety of computerized applications, each designed to handle certain specific functions during the end-to-end transaction cycle of the transaction. In the course of the life cycle of the transaction, the transaction suffers from inefficient processing of the transaction because there are many changes in the transaction which are untracked and/or undocumented. Most changes are documented on single purpose manual logs which are not integrated throughout the departments or provided to the employees responsible for the transaction. At a given point in time, it is difficult to determine which steps have been completed and which are outstanding as the transaction progresses through its life-cycle. The status is therefore difficult to determine at any given point in time. Because of the uncertainty in determining the transaction's status, there is a general lack of accountability for the transaction and there is a risk that some critical tasks remain unperformed or that transaction processors may be unaware of needed action. It would be beneficial to display the current status of the monitored functions, provide a place for assignment of the loan transaction to various users, provide a place to record specific and general information regarding the current condition of the transaction and to maintain a history log of the transaction's activities throughout its life-cycle.

In addition, to the numerous users and systems currently in place in typical commercial institutions, the authority is also segregated. This authority is typical charged with approving the transaction and any amendments thereto. In current transaction systems, this approval is complicated, time consuming, highly susceptible to human error and can be disruptive to processing workflow and transaction closing deadlines. Within a commercial lending institution for instance, lending authority is divided among lenders, senior lenders, other types of senior managers and loan committees. The ways in which lending limits are distributed among these roles vary greatly; however, they follow similar patterns. For example, a junior lender might not have any lending authority and may be required to consult with a mentoring lender for any approval decisions. The lender then might have basic authority to loan up to a certain limit i.e. $100,000 versus $10,000,000) or he may be limited based upon the type of loan (i.e. secured versus unsecured) or the terms of the loan (i.e. 12 months versus 60 months). A senior lender, market manager or committee member might have higher authority with certain key managers having higher authority, and the loan committee having authority for the remaining loans. During processing of the loan, the approval is verified to make sure that the proper approval has been obtained for the loan and any amendments thereto with phone calls, manual signatures or other manual steps. This tracking is time consuming, subjective and highly dependent on well-trained and knowledgeable loan servicing staff. Further, because financial institutions are often spread-out over various distances in different officers, senior lenders and managers may be located in different facilities and the loan documents may be missing one of the required signatures. In addition, if the loan was committee approved, either meeting minutes must be obtained with proper signatures or the signature of every committee member may be required. This method is time consuming, subject to error and can be disruptive to meeting the turnaround times required for loan processing.

Other approval concerns in institutional systems are to insure that the approval matches the institution's, institution-wide policies along with a means for the tracking and auditing of transaction statistics. It would be beneficial to have an approval process in a institutional transaction system in which information was provided about the type of approval needed for the transaction along with a place to approve and/or record or signify approval of the transaction and any amendment to it as well as some indication that the data was accurate and certified.

For example, commercial financial institutions establish polices which govern the terms of loans which will be accepted and the standard practices which will be adhered to. In the course of negotiating the loan, deviations to the standard policies or loan terms will be requested. Some examples include a request for customized loan language or changes of specific loan terms, or the borrower may have had a negative history with the institution, or be within a highly volatile industry with questionable longevity. These conditions or deviations may necessitate a review of the loan or the proposed loan by the lender's legal department. In addition, certain loan factors may require a legal department review. Existing systems typically rely upon manual human intervention to identify a loan for legal review. In addition, existing systems often provide no effective means to track and ensure that the institution's legal review policies are followed. Failure to follow proper legal review can result in drastic consequences, including an inability to collect on the loan or a loss of rights to take the collateral which was pledged against repayment of the loan. It would be beneficial to have a commercial lending system which provides a place to communicate a request for legal review, provides facilities for the reviewer to approve or decline loan changes, records and logs such approval or rejection and provides the ability to generate an automated request for legal review based upon specific criteria.

In addition to the complexities surrounding an institution, the customer and collateral involve unique complexities. Commercial customers are often organizations with multiple entities within the organization, each entity having unique characteristics. These entities often have ongoing relationships with the institutions, acquiring multiple transactions which are being paid at any given time. The collateral which is used to secure a commercial loan also has complex qualities. In a commercial loan, a single collateral item can be used simultaneously on multiple loans. In some cases an older loan may close out before earlier loans using the same collateral. Because both customers and collateral may be repeated throughout the commercial lending process, it would be beneficial to allow the loan data to reused in such a way that the unique identification of the data can be customized for a specific loan transaction while preventing the corruption of the data itself.

Prior art attempts to addresses problems included Norris U.S. Pat. No. 6,105,007, which discloses an automatic financial account processing system which uses a kiosk to conduct loan transactions. Davidson, U.S. Pat. No. 5,699,527 discloses a method and system for processing a loan by having a loan applicant input loan data and then transmit the data to a lending institution. However, heretofore there has not been available a commercial loan transaction system with the advantages and features of the present invention.

SUMMARY OF THE INVENTION

In the practice of the present invention, a transaction system is provided for workflow management and data collection of institutional transactions, including workload management, workload distribution, legal review, task checklist, automated data interaction and policy enforcement, monitoring, auto-navigational, collateral and customer management.

BRIEF DESCRIPTION OF THE DRAWINGS

FIG. 8 is a sample screen of the Filter Options display screen within the transaction workflow and data collection system.

FIG. 9 is a sample screen of the Column Options display screen within the transaction workflow and data collection system.

FIG. 11 is a sample Application Frame display screen within the transaction workflow and data collection system.

DETAILED DESCRIPTION OF THE PREFERRED EMBODIMENTS

I. Introduction and Environment

Figure 1:
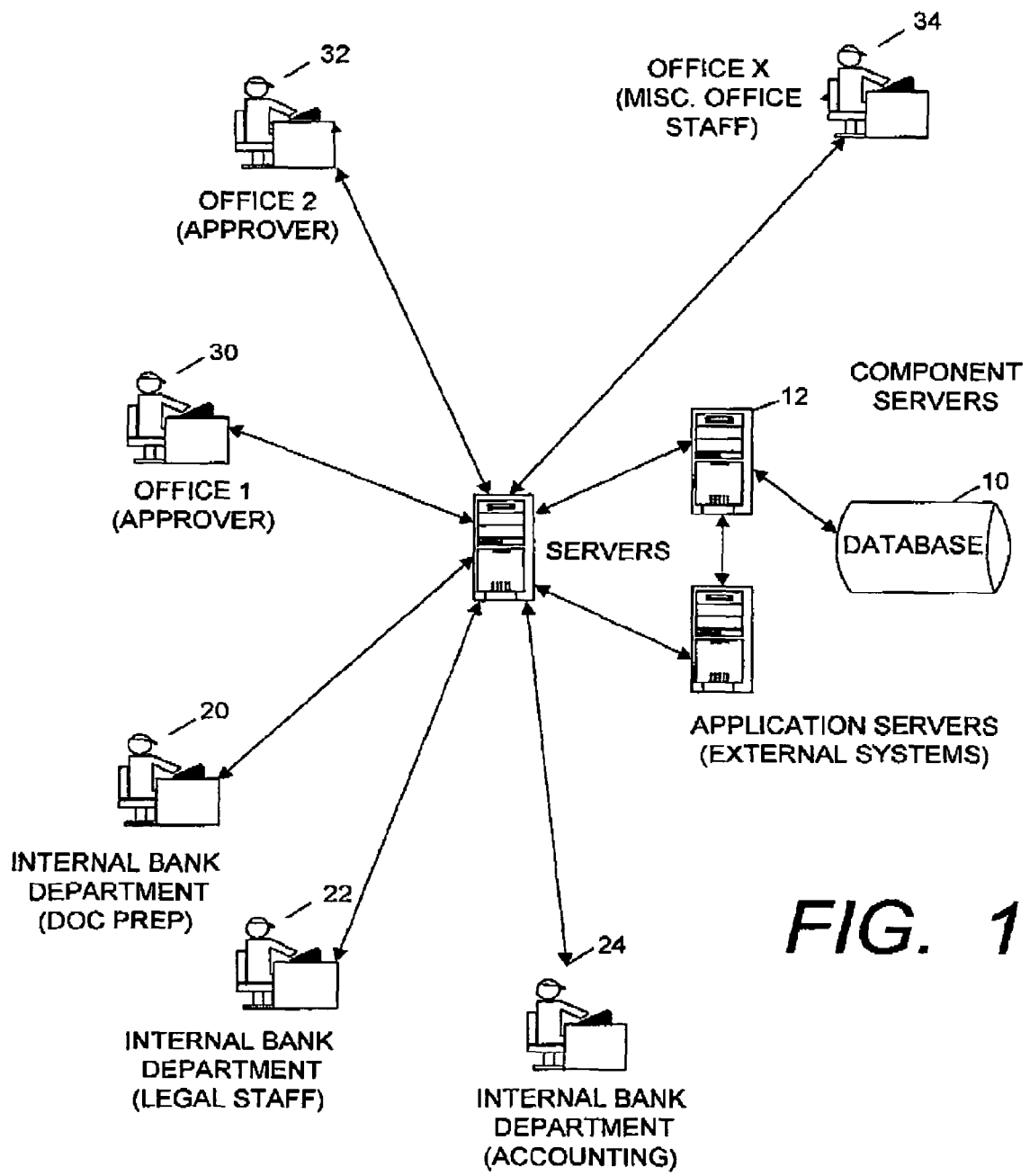
FIG. 1 is a physical overview of a transaction-based system within a financial institution.
Figure 2:
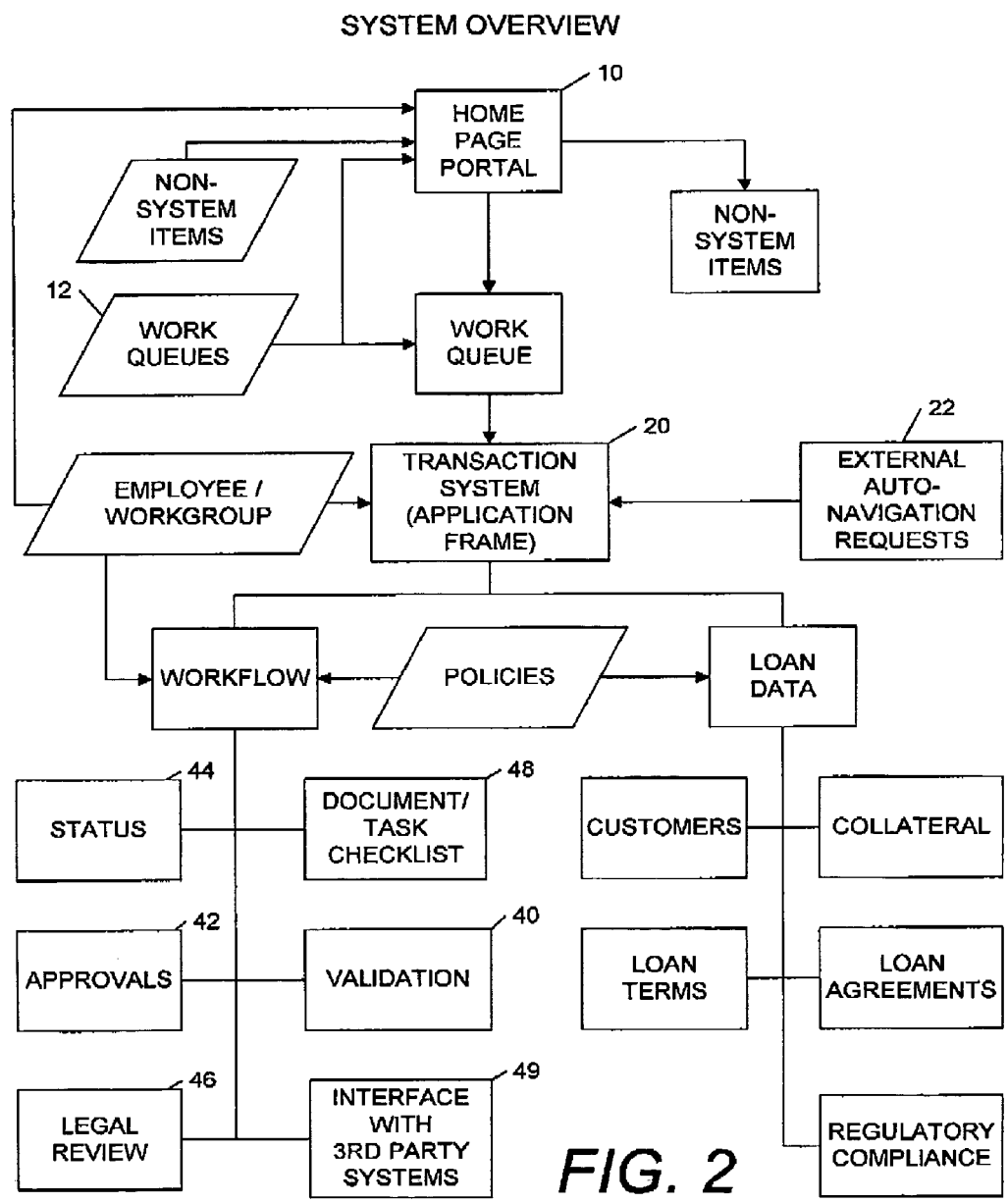
FIG. 2 is a block diagram of the System Overview of the transaction workflow and data collection system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, transaction, institution, policies, profiles, hierarchy, customer refer to possible applications of the system and should be considered broad because although we user financial institution as an example the system applies to complex transaction based institutions which have similar characteristics but have minor differences in policies, profiles, hierarchy and customers.

Credentials, facility, navigation, transmitted, interface, workflow, legal, life-cycle and filtering mechanism refer to the transaction and various steps undertaken throughout the transaction process. Because the invention involves transactions with various characteristics, the meaning of these steps should be given broad definitions. Queue, query, array, display, dataset, subset, ruleset, data, information and data structure refer to the information processing involved in the invention from the standpoint of a computerized system. Because the invention involves a number of different transaction based systems and institutions the terms were given a broad meaning by the inventor. Specifically, "Base Work Queue," "User specific Work Queue," "Work Queue" are designed to mean a structure which defines the permitted data which can be associated with the Queue. "Work Queue List," is the result of a query based on the parameters provided by Base Work Queue, User specific Work Queue and the Work Queue. "Query" is defined to mean a configured searching mechanism. Said terminology will include the words specifically mentioned or described, derivatives thereof and words of similar meaning by one skilled in the computer, programming sciences and the financial, industrial, governmental or commercial industries.

II. Preferred Embodiment Transaction-Based System

It is to be understood that the invention can be embodied in various forms and is not to be limited to the examples discussed above. As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized, including hard disks, CD-ROMs, optical storage devices, or magnetic storage devices.

The present invention is described below with reference to block diagrams and flowchart illustration of methods, apparatus (i.e. systems) and computer program products according to an embodiment of the invention. It will be understood that each block of the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

A method for managing workflow and data collection for a transaction-based system in accordance with the present invention comprises the steps of configuring the system based upon the objectives of an institution and comparing the configured system against stored transaction data; displaying the data as it transitions through the various workflow steps in the life cycle of the transaction; and communicating the data to a third party system. The typical workflow steps include identifying the transaction, deciding the appropriate workflow step, executing a workflow step, monitoring the status of the transaction and determining a next step for the transaction in its workflow. However, other components and configurations can be utilized in the practice of the present invention, and the applicant intends to encompass within the language any structure presently existing or developed in the future that performs the same function.

The commercial transaction can involve different individuals from different geographic regions. Information about a specific transaction can be gathered or entered by these different individuals, each with a potentially different responsibility for the transaction, and the information can be combined and stored in a central area. FIG. 1 shows a financial institution as an example of a transaction system. As indicated in FIG. 1, the transaction can have information from different individuals residing in different office locations. The central repository can reside on an information server located in one location or multiple locations. Although FIG. 1 depicts the information stored in a central repository, this is not a requirement of the system. The system could be a mainframe, a client-server or a server-server configuration with each computer storing certain parts of the information locally or any of myriad other possible hardware configurations. The database 10 is shown connected to the component server 12. The internal department staff 20-24 are shown interacting with the transaction, each having their own responsibilities while the outside office locations have personnel each with their own responsibilities for the transaction. Together the internal departments and the outside offices work together handling different aspects for the complex transaction based system.

The commercial transaction system is designed to integrate, manage and track the process steps and corresponding flow of information in the transaction lifecycle. The system does this by collecting information about a specific transaction, processing the transaction workflow and exporting information to third party systems.

Specifically, the system entry point is the Home Page Portal 10, which is an organized entry page with various resources needed by the user throughout the day, including non-system specific information. The Home Page Portal 10 serves as a portal into both the workflow system and also provides links to the various other systems and resources related to transaction-based systems. The home page is governed by user profiles, which specify a user's rights and preferences in the system. User profiles are created in a Validation 40 process that uses hierarchical organization structures to grant rights and structure each user's access to system data and features.

From the Home Page 10 the user may select work queues. Work Queue 12 is a powerful and highly customizable vehicle to generate search queries against system data, display results in list form and integrate the selection of available functions that can be performed on work queue list items. Work queues are highly extensible and provide a powerful means to deliver, from a single base work queue, search and view parameters that are customized to each individual user. Within Work Queue 12 the user may tailor view characteristics and search criteria specifically to his needs, and may save those settings in the original work queue or spawn new work queues based on the original one.

From the Work Queue 12 the user may select a transaction to manipulate. Functions available to the user are embedded in the Work Queue 12 so that each user sees the specific functions pertinent to his tasks. Users may add, edit, delete and perform various other functions on transactions as granted in their user profiles.

Selecting a transaction to edit invokes the Application Frame 20. The application frame is the housing within which other processes such as Approvals 42, Status 44, Legal Review 46, Validation 40, and Document Checklist 48 execute. The Application Frame 20 forms a structure that provides navigation and other services that are used by the processes invoked with and from the Application Frame 20.

In addition to forming a structure, the Application Frame 20 also helps navigate through the system with a tabbed navigational structure and an Auto-Navigation facility 22, which allows the user to quickly and automatically navigate to a specific screen, data instance and field associated with the graphic screen that is of interest to the user.

Within the transaction system, the system may integrate the user profiles and/or institutional policies in determining which workflow processes or data collection processes the user can perform on the transaction. In matching the institution's objectives to the transaction system an administrator configures the system policies taking into account those objectives and limiting or granting access to information, processes or functions based on those objectives. The system policies can also include user profiles taking into account the user type and user id and again limiting or granting access to information, processes or functions. The administrator can also take into account the institution's operational and organization hierarchical structure when configuring the user profiles by associating a user type or id which matches the operational and organizational hierarchy. When configuring the system, the administrator can store the rules and policies using the institution's business rules in a rules repository. This process can also be used to store transaction policies, approval policies, legal review policies and document profiles.

Within the workflow processes, the available processes include Status 44, Document/Task Checklist 48, Approvals 42, Validation 40, Legal Review 46 and Interface with Third Party Systems 49.

Status 44 monitors the current state of the required activities in the transaction workflow. As processes occur, such as Approvals 42, Validations 40, Export and other critical activities, they update Status 44, conveying where the transaction is in the process at the current time. Event and communication management features provide an easy ability to integrate communications into the process steps and a complete ability to review those in event logs.

In the course of processing a transaction it may be necessary to collect documents from clients. These documents relate to the business entities as clients, the collateral involved and other relevant documents. Some of the documents are necessary to start the transaction, such as a corporate resolution showing that the person can sign on behalf of the client, and other documents may not come in until the transaction is complete. Document/Task Checklist 48 automates determining which of these documents is required and at what point in the process the document is needed. It then manages the tasks of recording and confirming the dispositions of each document.

Several levels of approvals may be required during the transaction. Often a senior level institution representative may approve, while at times a committee approval may be necessary. In addition, a user may be required to mark its own approval to certify the accuracy of the transaction data. A legal review may be needed when specific terms of the transaction are outside the institution's standard terms and conditions. In addition, terms may be amended during the course of the transaction, which may need approval as well. Approvals 42 and Legal Review 46 provide a user-friendly method to request and process these approvals and reviews and log the activities to ensure a complete audit log.

Validation 40 tests the rules against predefined workflow checkpoints that define which data are needed and at what point in the process they are needed. This allows the loan transaction to move forward with the portion of data available and necessary for early steps, and more specific information such as a legal description of property, to be entered in later steps.

Interfaces with Third Party Systems 49 are part of the transaction-based system because the system can flow data and track the progression of steps that are both inside and outside the workflow system. Because of the standard protocols, interfaces are easily integrated into the system. The interface features utilize a common solution and are therefore adaptable for additional system interfaces to other systems, which help the system accommodate alternative institutional transaction systems.

In addition to the Workflow processes described above, a series of data entry screens collect information about the customers, the transaction terms, payment schedules, agreements that will be produced, collateral that may be involved in the transaction and other transaction data. Available processes within the Transaction Data processes include Customers, Collateral, Terms, Agreements and Regulatory Compliance.

Various control lists and screen rules govern the input of the data; however, the vast majority of the policies regarding the transaction data is removed from the screens themselves and is instead contained in a Validation Function within the Workflow process. However, the system is configured based on the objectives of the institution. Most institutions have policies, rules and regulations which govern its processes. In the same regard, this application is unique in allowing the institution to configure those same rules, regulations, policies and objectives programmatically into the transaction based system through a graphical user screens. In addition, the system is configured for various users of the system in the Employee/Workgroup process so that various users are given different user types and different access levels. These configurations are configured once and used throughout the system to assist the user and the institution in the transaction system.

In commercial and financial transactions, both customer data and collateral data have unique complexities. Commercial customers are often business entities. To produce legal documents it may be necessary to represent the business entity structures. Customers provide the ability to input these structures and manage and reuse them among transactions. Collateral data also has these customer structures associated with it and has complexities related to collateral reuse as well. Collateral supports the input of collateral data, manages the reuse of collateral among multiple transactions and supports attaching these complex customer structures in the form of entities granting rights to the collateral.

Figure 3:
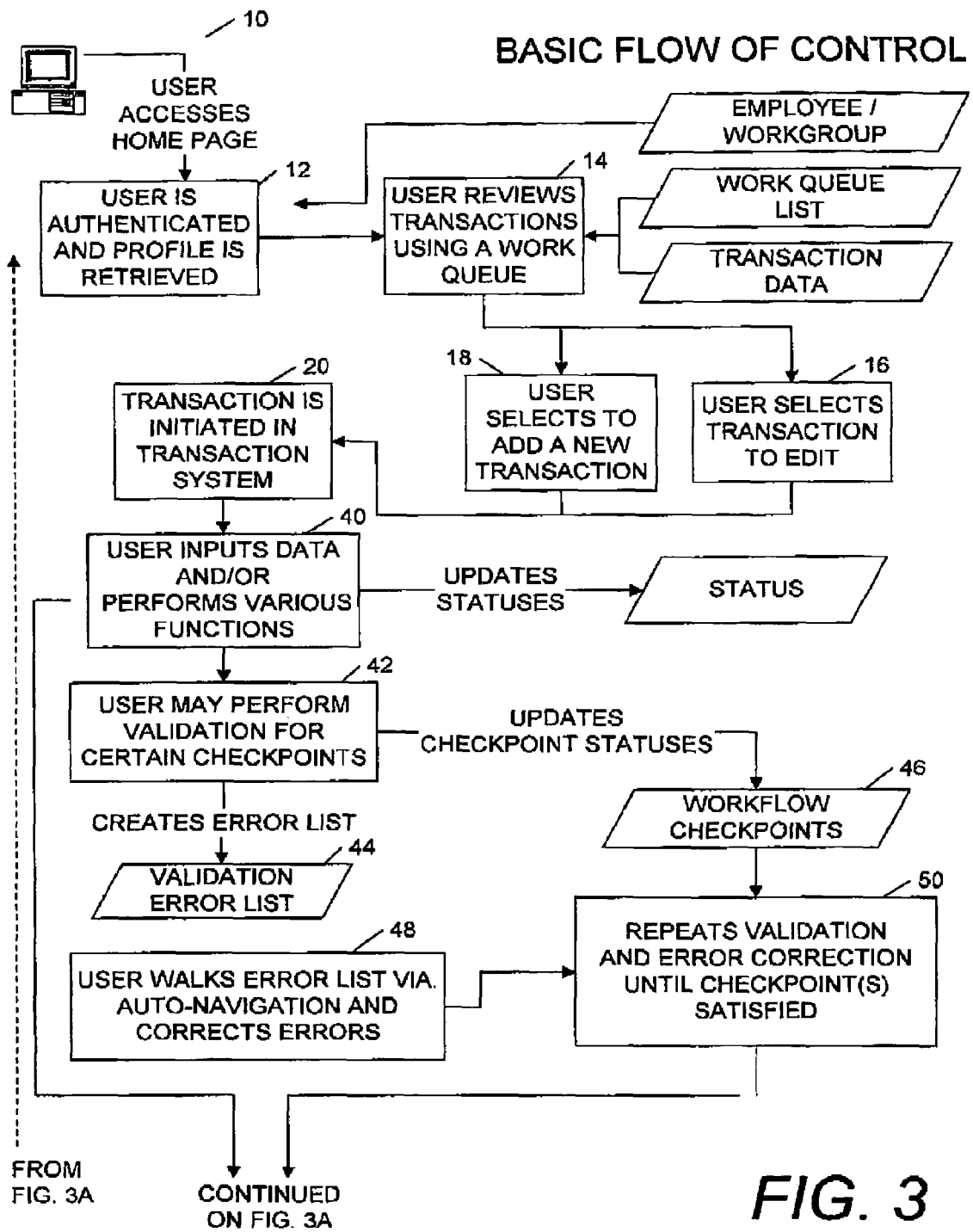
FIG. 3 is an example flow of control diagram for a user of the transaction workflow and data collection system.
Figure 3A:
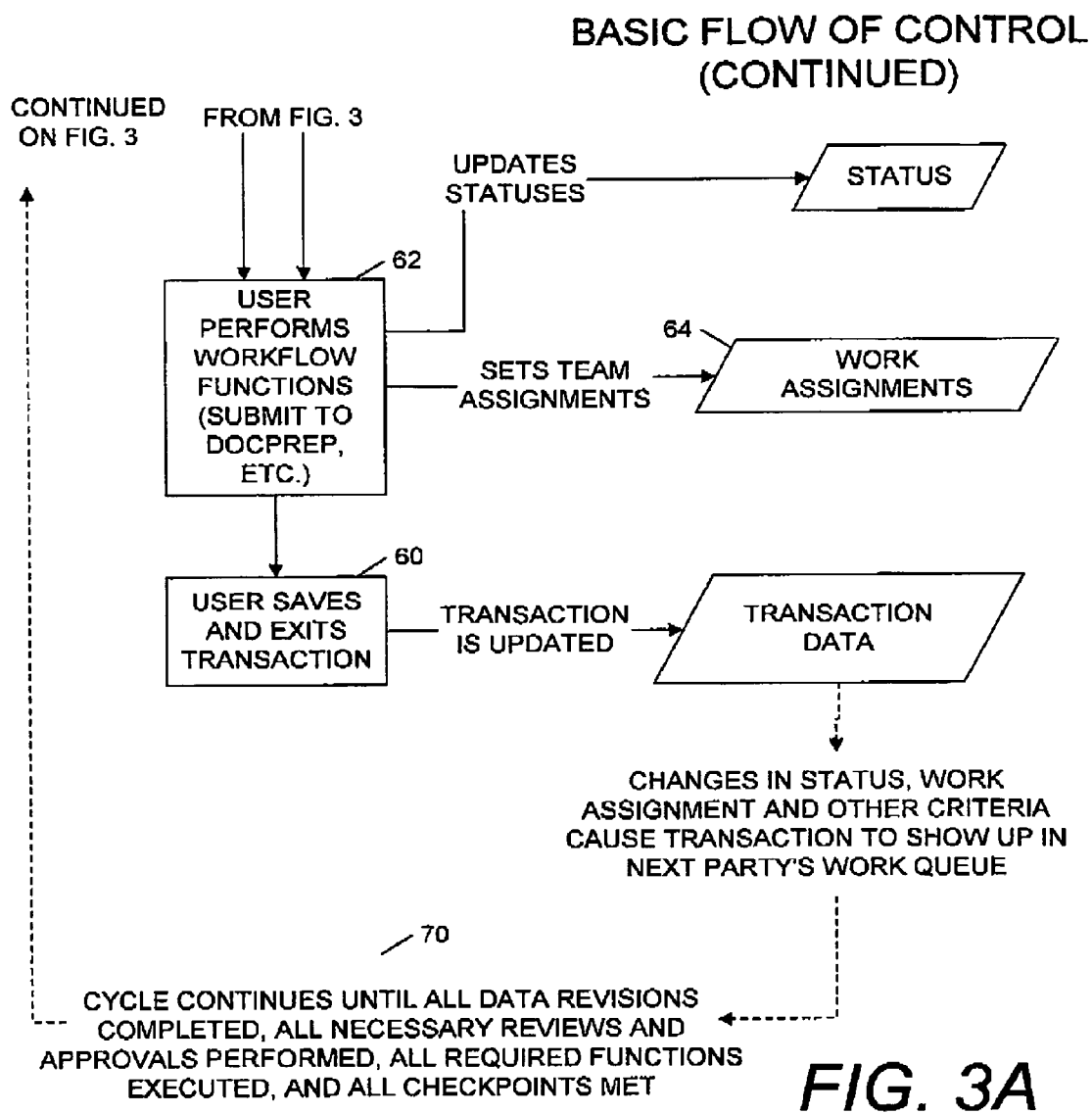

FIG. 3 shows a basic flow of the transaction workflow and data collection system. In FIG. 3 a typical user accesses the home page 10, which checks the user profile based on the user permissions that may have been previously entered into the system 12. After the user logs into the system on his home page 10, the user can review the stored Work Queue's selecting a transaction from the reviewed Work Queue List 14. After choosing which transaction to review, the user can edit that transaction 16 or select to add a new transaction 18 from the Work Queue. After deciding to add a new transaction, the transaction is initiated in the transaction system 20 and the transaction processing component, application frame, is displayed. At this point the user enters data and performs functions on the transaction created 40. After creating the transaction, the user can execute a validation function 42, which will produce an error list 44 based upon comparing the transaction data with institutional objectives. The validation function also determines which steps in the workflow process have been successfully met 46. Depending on the generated error list 44, the user can navigate through the list 48, correcting any information to fulfill the requirements for the current workflow step 50. After correcting any information, the user may then decide to execute workflow functions 62 or the team assignment functions 64, which set responsible parties for the next steps in the workflow process. At this point the transaction will undergo several functions 62 from different users, which may include Input functions, Export to Laser Pro, Approval, Status or other functions depending on the specific transaction. The system processes the transaction through the necessary steps with the help of system functions, including Document Checklist, Legal Review, Approval, Export to Laser Pro, etc. . . . The system continues processing the transaction until the transaction receives all necessary reviews, approvals and documents; all required functions have been performed; and all checkpoints have been met 70. Then the transaction is completed and the transaction system assigns a final status to the transaction.

Figure 4:
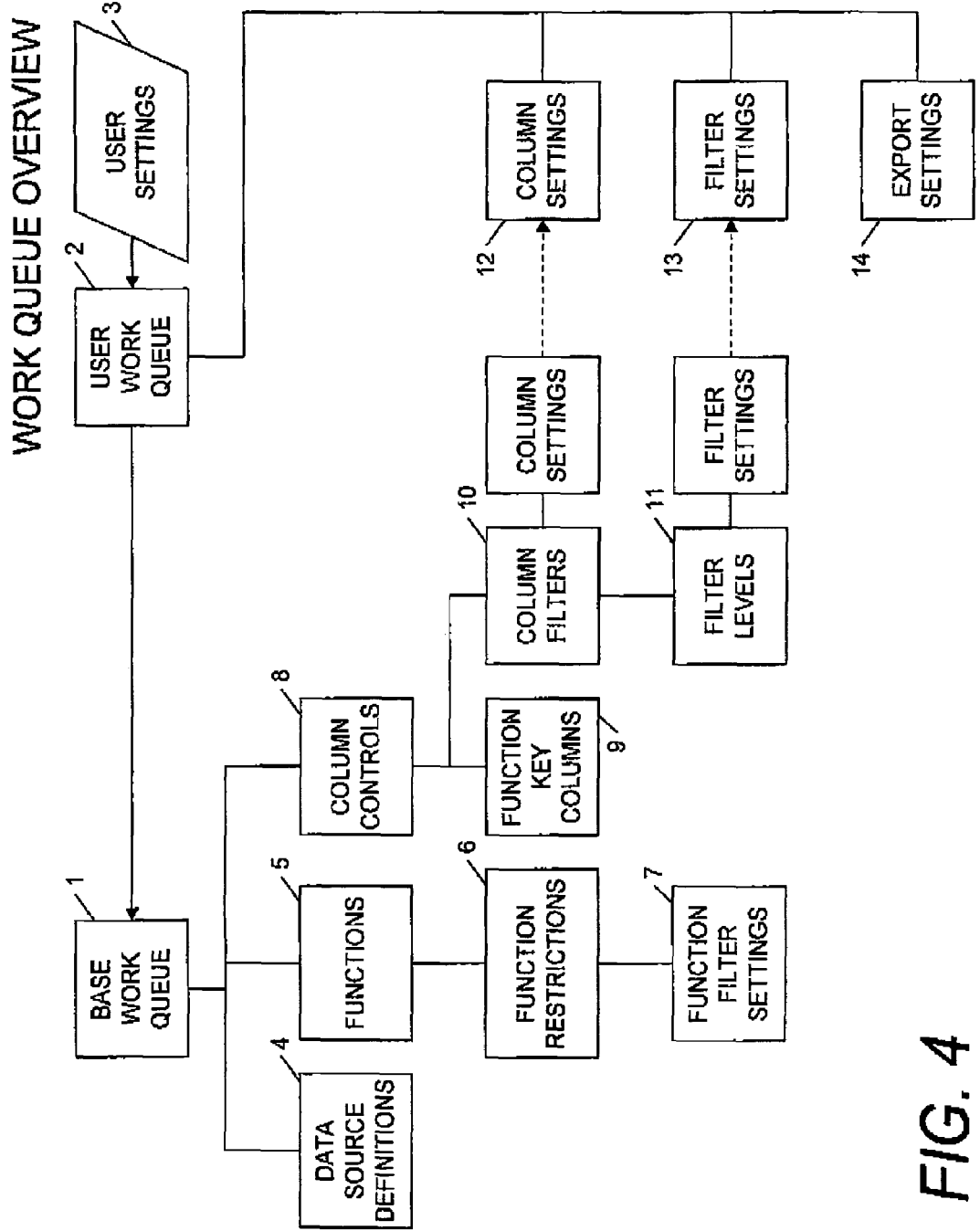
FIG. 4 is a block diagram of the Work Queue Overview within the transaction workflow and data collection system.

Because of the complexity and power of the Work Queue system, FIG. 4 provides an overview of the Work Queue process. The Work Queue is a mechanism to recognize a set of user specific transaction data tailored to the user, the user's responsibilities and the institution by filtering, formatting and/or presenting the information, which can be manipulated by the user. In addition, Work Queue is adaptable to a variety of applications.

Using a loan system as an example, when the user logs onto the system, the user sees a screen which shows the loans due today which are assigned to the user. The user can view the list and select a loan to edit from the list. By selecting a function to a specific transaction, the user is navigated to the edit screen for the specific transaction which needs attention.

The Work Queue is comprised of two distinct queues, a Base Work Queue 1 and a User Work Queue 2. The system also utilizes a Work Queue Query and a Work Queue List. The Work Queue Query is created as a result of configuring the User Work Queue and the Work Queue List is the result of executing the Query on the transaction data. The Base Work Queue 1 creates the general structure of the Queue, which can be used to create additional Base Work Queues or User Work Queues for each user based on the system settings for the user 3. The User Work Queue is the Work Queue configured for a specific user type or based on a user id. A User Work Queue can be saved as a template by a specific user once he has configured or accessed the User Work Queue.

Within Base Work Queue, Data Source Definitions 4 specify the type of source and control data which will be allowed within the queue. In addition, when the Base Work Queue is configured, it includes Functions 5 which can be restricted 6 and filtered 7.

In addition to including information about the data source and the functions, Base Work Queue includes Column Controls 8 which are configured based upon the Function Key Columns 9, the Column Filters 10 and the Filter Levels 11. Data Source Definitions 4, Functions 5, and Column Controls 8, together depict the overall data structure of an implementation of the Base Work Queue 1. The Base Work Queue 1 is not a list of transaction data but is a structured set for which transactions can be organized.

By combining the Base Work Queue with the User Profile settings from within the Employee/Workgroup process 3 a user specific Work Queue is created, called User Work Queue 2. By integrating the user profile 3, the user settings data is added to Column Settings 12 and Filter Settings 13 within the User Work Queue 2. The user settings data is that part of the work queue that is generally allowed to be modified by the user. Once the User Work Queue 2 is created, the user is allowed to generally organize the user specific columns, filters and functions. By filtering the information, selecting which columns to display, selecting which functions to associate with the specific columns and other settings, the user refines the User Work Queue and creates the template from which other User Work Queues will be created. User Work Queues can also be defined to hide information as well as secure access to some or all of the settings data.

The result of accessing the User Work Queue 2 is that the system translates the various configurations into statements necessary to implement the query. Once the query has been created, it is executed on data which has been introduced to the system when defining the various system parameters 4. The result is a list of records which match the query. The results may be displayed on a screen in a Work Queue List or the results may be exported 14. If the results are displayed, the user has an ability to organize the resultant records.

From a user's perspective, Work Queue consists of three main pieces. The Work Queue List, the Column Options Screen 12, and the Filter Options Screen 13. The Work Queue Lists is what the user first sees when he invokes an existing work queue. The Work Queue List displays the result of a Work Queue Query and allows viewing of the transaction data and selecting specific transactions on which to execute commands. The Column Options Screen 12 allows the user to customize the transactions being displayed in the Work Queue List and the Filter Options Screen 13 allows the user to control the transactions displayed in the Work Queue List.

In addition, the user may use an Export function 14 to export the results of the Work Queue Query for use outside the Work Queue itself. A Work Queue can even be constructed so that the Column Options 12, Filter Options 13 and Export functions 14 are not available or limited in their availability.

Figure 5:
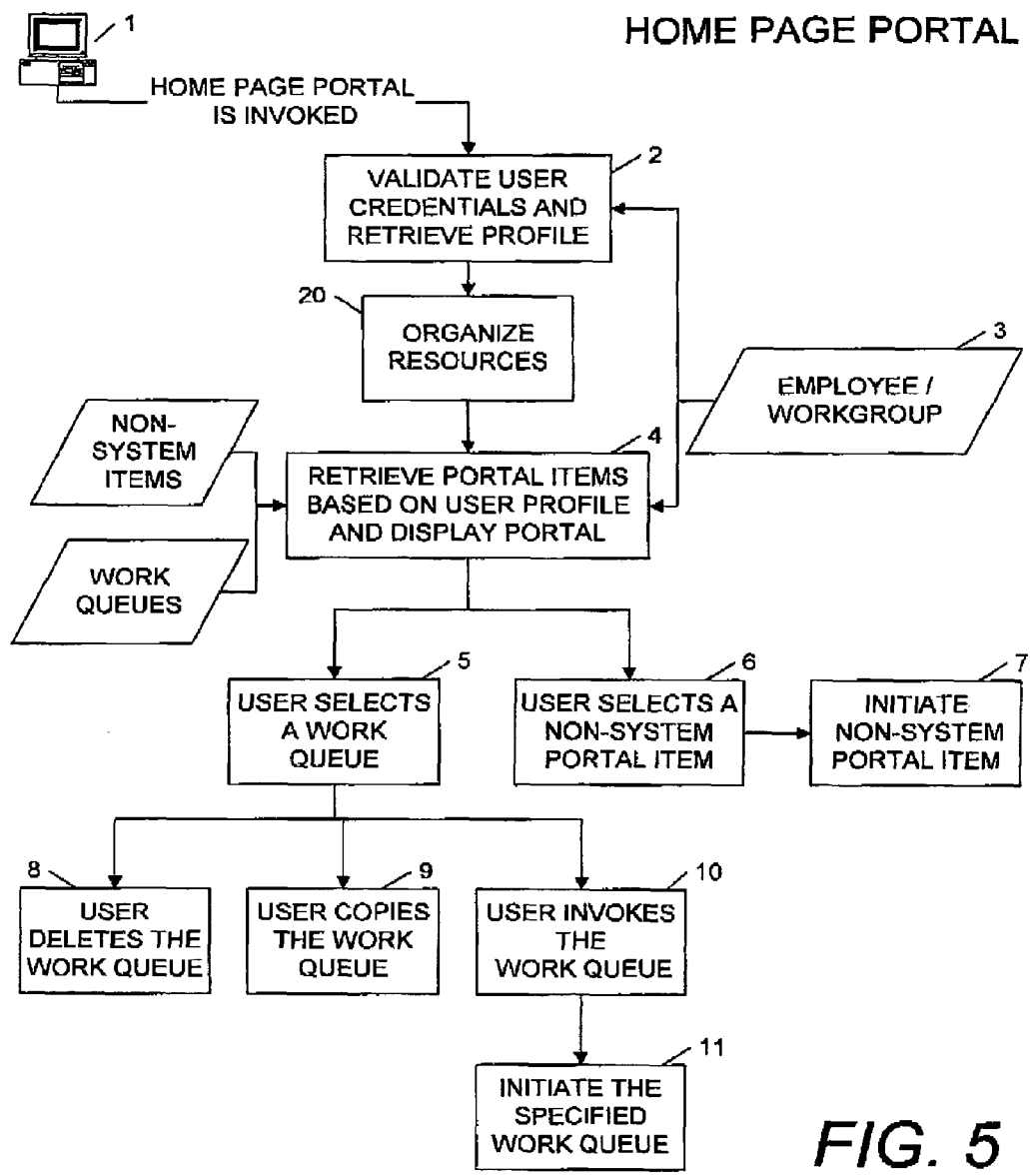
FIG. 5 is a block diagram of the Home Page Portal process within the transaction workflow and data collection system.

FIG. 5. shows the details of the user accessing the system from the Home Page Portal. The Home Page Portal operates as a portal providing access to various internal and external systems, files, documents and other content of interest to various users. Access to the Home Page portal may be stored as a shortcut on the desktop of the user's computer 1 or they may be linked via a URL from a web browser or some other method. Authorization to view and control the content of interest is based upon the user profile of the user. Home Page Profiles control the categories and items within each category on the Home Page Portal that each user is authorized to access. Upon request for access to the system, the Home Page validates the users's credentials 2 and retrieves the user profile 3. If the user id is not available, or the user id is not confirmed as an authorized user, the user is prevented from accessing the system. If the user has the proper credentials and access is granted, the various resources are Organized 20 based on user type and user id. The portal items are then Retrieved 4 and displayed based on the user profile and relevant operational information. If the user type is Developer, an Alias procedure is used which allows the user to switch to any user-id in the system in order to access the system as that user. This Alias procedure allows the testing of the system by individual user id.

Upon access to the system the user may choose to access a Work Queue 5, access Non-System items 6, or exit the system. If the user decides to exit the system, the Home Page session is terminated. When access is selected to Non-System items 6, the user can choose an item from the content category lists, invoking the associated file, document or other content 7. If the item is web-based, a browser window is opened with the associated URL and if the item is an executable, the application is executed. User specific Work Queues 5, which have been saved or configured for the user, are also available on the Home Page Portal page.

If the user selects a User specific Work Queue 5, the user can either delete a User specific Work Queue 8, copy a User specific Work Queue 9 or invoke a User specific Work Queue 10 to perform one of the many User specific Work Queue processes 11.

Figure 6:
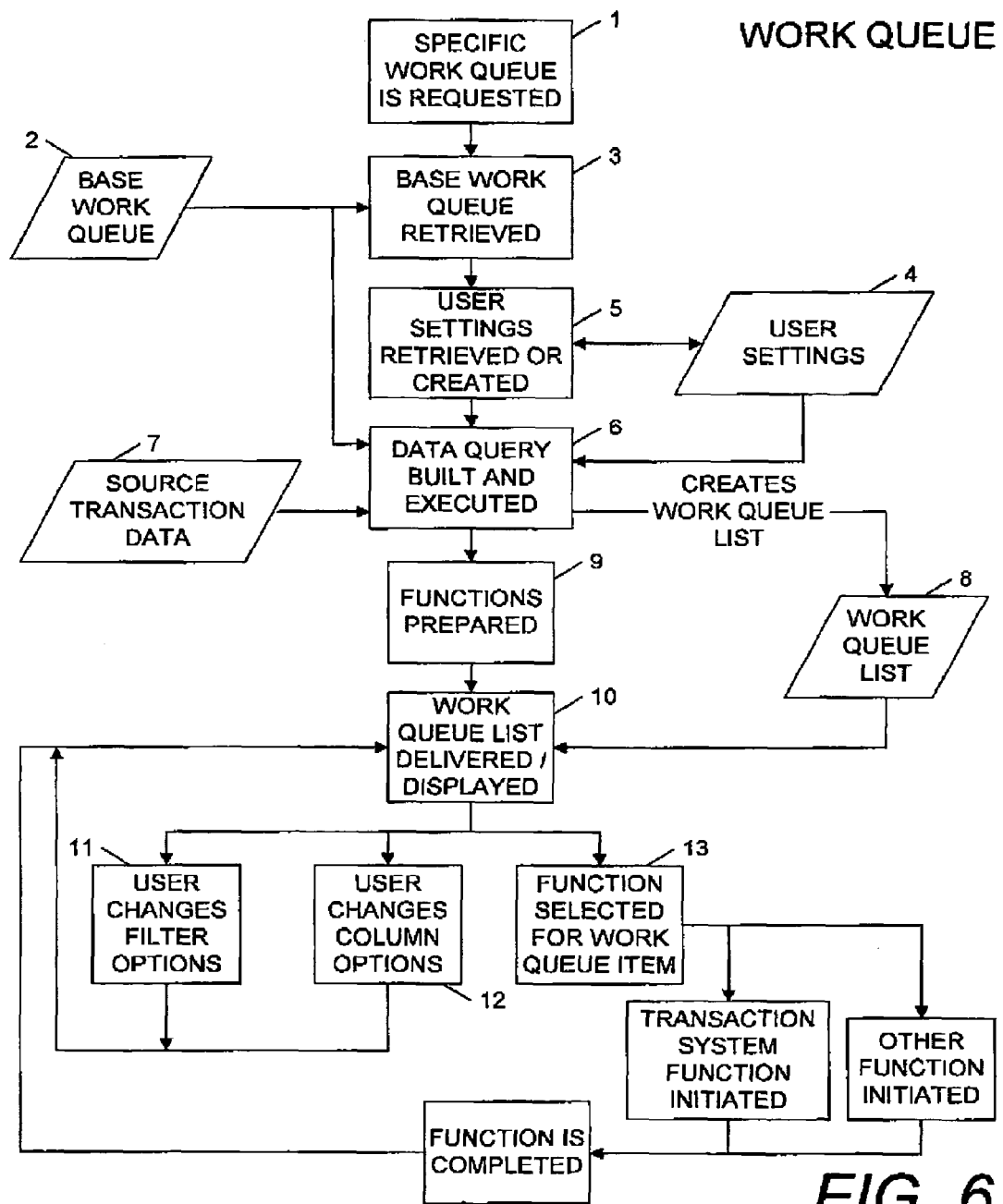
FIG. 6 is a block diagram of the Work Queue Process within the transaction workflow and data collection system.

FIG. 6. illustrates the Work Queue process. As described earlier, Work Queue is a mechanism used to recognized a meaningful set of application data, tailor the formatting and/or presentation of the data, filter the data so that only the desired subset is gathered and allow manipulation of the data such as the execution of application specific commands on selected data. Even though the illustrations of the Work Queue process are limited, the process is not limited to the illustrations and is adaptable to numerous different applications, including commercial, industrial, governmental, health care and financial industries.

FIG. 6 shows an embodiment of the Work Queue process which may be implemented by the System. In FIG. 6. the Work Queue is requested by a user which can occur at the Home Page Portal, as a shortcut on a client desktop, as a hyperlink from another web page or from some other means. In FIG. 6 a specific user requests a specific Work Queue 1 whereby the system loads the Base Work Queue 2. A Base Work Queue specifies the Data Source which includes the Data Source Tables. In one embodiment the Base Work Queue 2 may be comprised of plural arrays of data, each array having an identifying field such as a column heading or row heading. In addition, the Base Work Queue 2 includes various Functions, Filters and Column Controls. Functions may include restrictions allowing only authorized users to have access to the functions. Also, filters may be applied to the functions, allowing the resultant data to be used in applying restrictions to the function availability. Column Controls also included in the Base Work Queue 2 allow for various Column Filters and Filter Levels which allow any resultant data to be organized by information stored in the columns of the Base Work Queue 2. The Base Work Queue 2 may reside on a central server stored on retrievable storage media.

Upon request by a user to retrieve a Base Work Queue 3, the system passes the work queue id for the requested Base Work Queue 2 along with the user id or user type parameters of the user 4. The system then creates a User Work Queue 5 or retrieves the already created User Work Queue 5 based on the user specific functions and filters created or retrieved through User Settings 4. Upon retrieval of the User Settings 4 and the Base Work Queue 2 a query is created 6 using the already defined User Settings 4. If this is the first instance of the User Work Queue 4 for this user, the user is prompted to configure the User Work Queue 4 based upon desired function, column and filter settings.

Once the User Settings have been retrieved or created and the data Query 6 has been built based on the configured settings within the User Work Queue 4, the Query is executed 6 on the Source Transaction Data 7 defined by the Base Work Queue 2. The result of executing the Query 6 upon the Source Transaction Data 7 is the Work Queue List 8. In addition to transaction data, the Work Queue List 8 contains a set of available Functions 9. Once the Work Queue List 8 is created it can be displayed or exported 10. If Displayed the user has the ability to modify or review the identifying fields which may include Filter Options 11 or the Column Options 12 of the Work Queue. Once modified or reviewed the modified Work Queue List can be displayed and saved. The user can also execute a Function from within a Work Queue Item selected from the Work Queue List.

When the Base Work Queue was created, in addition to assigning the source data the process allows for the assignment and modification of various functions which would be available to various users from which the users can execute. The available functions fall into two categories: general and list item commands. General commands may include as an example Column Options, Filter Options, Copy Work Queue, Export, Help, and Exit; however, this list is not exhaustive and may include other commands.

List item commands can be general or specific to the system and therefore, are highly customizable to a specific application. General list item commands may include as an example Add Item, Edit Item, View Item, Print Item, Copy Item and Delete Item; however, this list is not exhaustive and may include other commands. Specific List item commands may include commands specific to Lending Institutions, Commercial, Industrial, Health Care and Governmental applications. As an example, if the system is a Lending Institution, the commands may include Close Loan and Renew Loan. Additional commands or functions may be added using a standard and open protocol.

Because the list item functions can be highly customized and filtered, the availability of a particular function may be tied to the specific data content of the resultant record. Using the previous example of a loan transaction, the Close Loan command may be configured to be available only if the status column equals "Docs Ready" so that when the status column of a particular record is equal to "Incomplete" the close loan command would not be available. General commands are available at all times during the Work Queue List screen 10.

If a function is selected, then the system initiates the function on the transaction and returns control of the Work Queue to the Work Queue List display screen 10.

Figure 7:
FIG. 7 is a sample screen of the Work Queue List display screen within the transaction workflow and data collection system.

FIG. 7, shows a sample List Item Commands display screen with various commands shown. At the top of the figure the Query is displayed 1 in natural language to help the user quickly identify the query. Invoking the Column Options 2 or Filter Options 3 command at the bottom of the screen brings up a Column Options Screen or Filter Options Screen which allows the column and filter settings of the Query to be modified, resulting in a new Query. The Copy Work Queue 4 command allows the user to create and name a new Work Queue based on the current Work Queue settings. The new Work Queue is then available within the Work Queue List, which may be selected again and customized while still preserving the original Work Queue.

Figure 8:
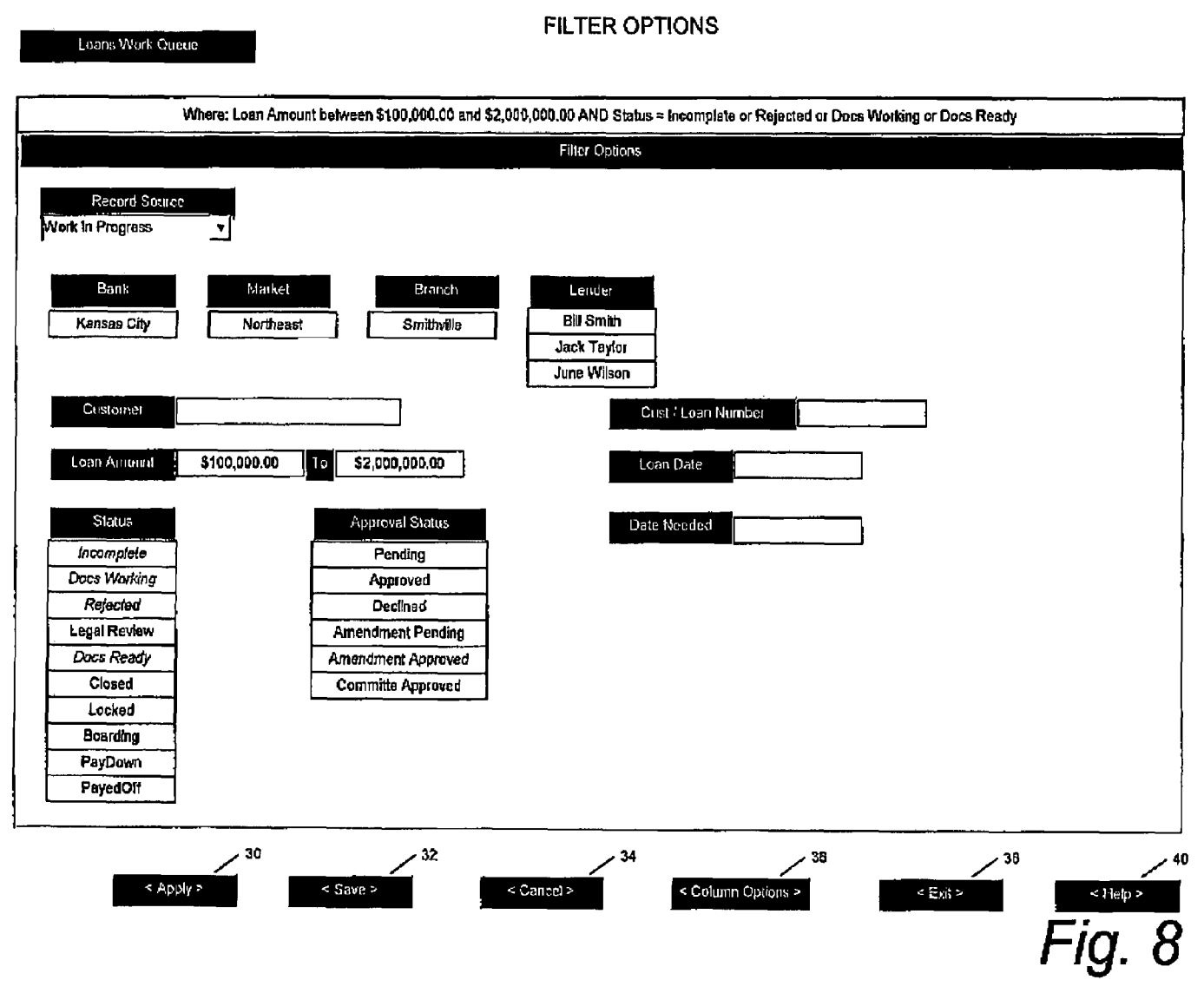

In the Work Queue filters perform the function of filter data and narrowing the resulting Work Queue List. Work Queue support a variety of filter types corresponding to the source data. FIG. 8 illustrates a Filter Options Screen. The Filter Options configuration screen displays the filters and their current setting on the transaction and provides the user an ability to customize them.

The system allows an administrator to initially configure and determine the transaction filter options. For many of these settings a user may not be able to alter. However, some may be modified. When the system references the screen, the system determines which columns have filters selected and the current values of the filter. The Filter Options screen then lets the user change the user filter settings. If a filter is associated with a column and it was marked to be included in the filtering, a filter options screen will be displayed. On the screen, the user can make changes or execute a command.

The screen commands are available based on the preconfigured data. In this case, the user can Apply, 30, Save 32, Cancel 34, Column Options 36, Exit 38 or invoke the Help command 40.

If the user chooses Exit, any session changes hat have not been applied are lost. If no changes have been made, the system returns to the Work Queue session. If the have been changes made and applied, the system returns to Work Queue and the new control data is used. If the user chooses Help then a separate help session is initialized.

If the user instead of executing a function makes changes to the filter's parameter, a data dirty condition is set. If after making changes the user selects Apply, those changes are recorded to the session control data but do not propagate to the permanent user profile data. This sets a data clean condition. If after making changes the user selects Cancel, those changes are discarded and the session control data is reset to match the current user profile data and the Filter Options presentation is reset to match the current session control data. If the user chooses Column Option, the system closes the Filter Options session and the system proceeds with the steps described below in the Column Options Screen, FIG. 9. During any exit operation the system checks to verify that all required filters have valid input and if not, the exit is terminated and the user must enter the required data.

A list of available filters is identified by the Work Queue Column Label. Filter types include Date, Date & Time, Alphanumeric, Numeric, Currency, Range, Single-select list, Mulit-select list, Input list, Roll-Up, Combination and others. Filters may also include Hidden, which cause the data to become hidden. Filter types may be used repeatedly to support filtering on any number of source columns that may be of the same data type and use the same filter types. For example, several different Roll-up filters may be used at any time.

The Column Options screen provides a means for the user to specify the column display options for a Work Queue. As in Filter settings, the initial column settings are preconfigured and many may not be altered by a user. However, some may be. In FIG. 9, Column Options screen, the user is presented with a listing of some of the headings for the data columns available for the Work Queue. The user is able to specify they column they wish to include and exclude, display or not display, the order of display, select or unselect a filter update sort criteria, etc. . . . They may rearrange the display order of the columns using a dynamic column move function that lets them grab a column and move it to a new spot in the display order. Control data also determine which columns may be used for sorting. For those columns, the user may select which columns to use in the sort, designate the priority of columns in the sort and specify the sort direction of each. For example, Customer field 10 can be sorted 12 and the Sort Priority 14 is 1 in Ascending order 16 and Loan Amount 20 can be sorted 22 and Sort Priority 24 is 2 in Descending order 26.

The Column Options Screen also has command functions available to perform on the filter options including Apply 40, Save 42, Cancel 44, Filter Options 46, Exit 48 and Help 50 which are similar to Filter Options Screen in FIG. 8. The one notable difference is the Filter Options 46, which is only available when the data condition is clean, i.e. when no changes have been made or if changes have been made, the changes have been applied. Filter Options takes the user to the Filter Options display screen.

Figure 10:
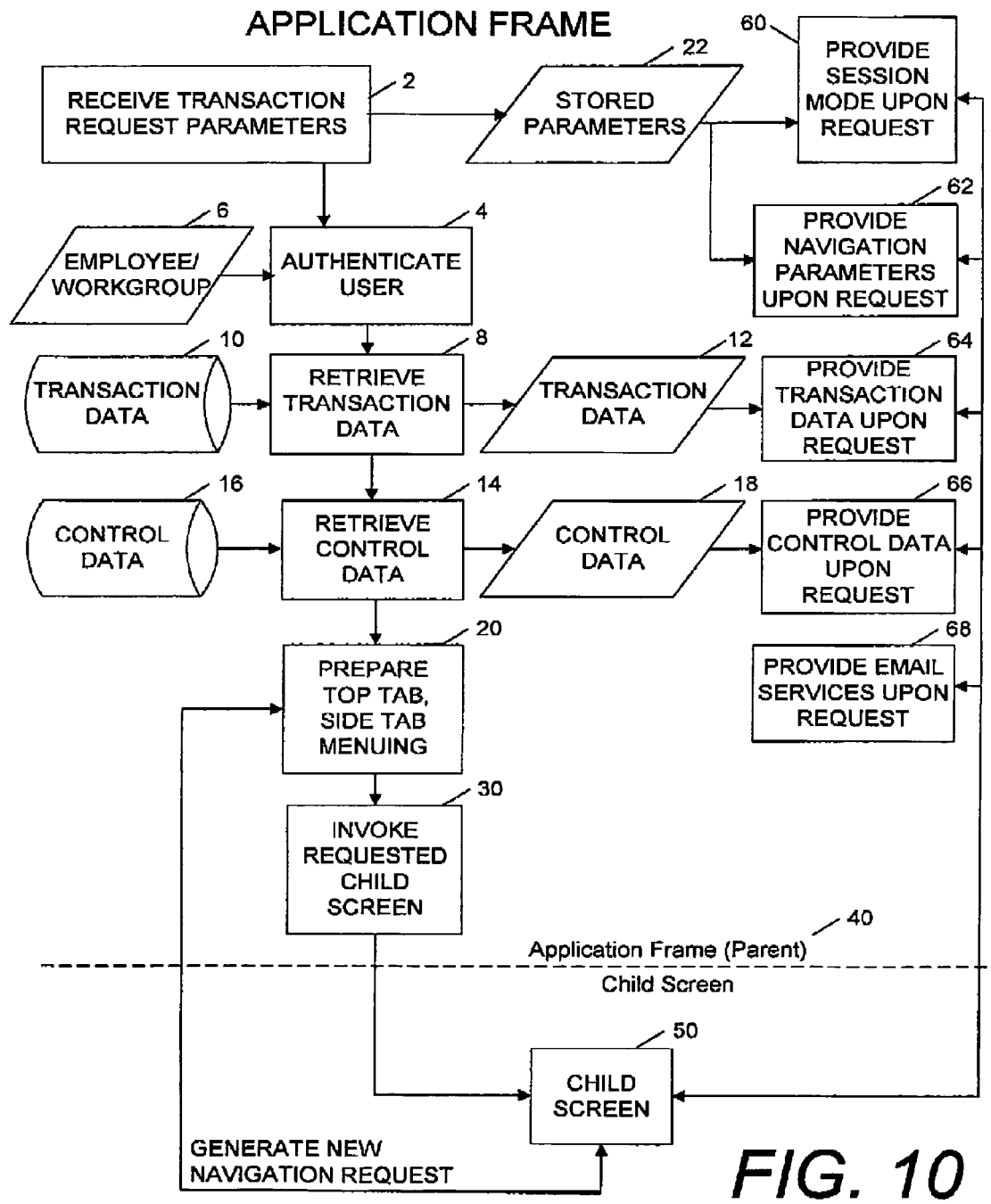
FIG. 10 is a block diagram of the Application Frame process within the transaction workflow and data collection system.

FIG. 10 shows a detailed flow of the Application Frame which provides an overall structure and set of basic services that are used by the entire Transaction Workflow and Data Collection System. The Application Frame is a customizable set of data and applications which provide consistency and flexibility in the navigational process of the system, combining screen and functional elements with the navigation of the system. It also includes external links to the system, allowing the user to specifically and quickly Auto-Navigate to the desired transaction, screen, selected item and field. In this way, the Application Frame goes beyond traditional menuing systems by providing functions as well as an Auto-Navigation process.

As shown in FIG. 10 the Application Frame is a framework that provides basic services to each of the screens and functions that exist within it. The Application Frame can be divided into several categories, Supporting Functions, Framework and Navigation.

Within the Supporting Functions, the system Authenticates the User 4 based on comparing the logon id with the user profile within the Employee/Workgroup process 6 to determine if the user has authority to access the system. The system also uses the user's type and other profile options to customize the Application Frame and its navigational and functional elements, making them and the user type and profile options available to any screen or function via the Framework.

After Authenticating the user 4, the system then retrieves user specific Transaction Data 8 based upon the id of the specific transaction which needs work or based on the pieces of work which need to be processed. This is accomplished by using a load routine to gather all of the data from its various storage locations and modes, collecting it into a set of Transaction Data 12 which will be made available to the Application Frame for the screens and functions within the Frame. In one embodiment of the Frame, the load routine may collect all aspects of the application Transaction Data 10 upon initialization and maintain that complete set of data during the life of the session. In another embodiment, the load routine may be subdivided and executed selectively for each portion of data needed by a given screen or function. This alternative approach reduces the amount of data being loaded and maintained at on time.

Once the Transaction Data 12 is made available to the system, the Control Data 14 is retrieved and made available to the Frame 18. Control Data 14 provides the ability to convert lookup codes to literal values, populating the various selection lists used on screens, validating certain inputs against a prescribed set of allowed values, providing local access to data for various intrinsic functions such as supporting Auto-Navigation or Employee/Workgroup processes, setting default settings at the system and screen level and other system-wide functions. The Control Data 18 remains available within the Frame as each screen is executed, allowing display screens, child screens and functions to utilize the resident control data either through direct and immediate access or as a parameter within a function.

In addition, when the Application Frame is invoked, the system provides Navigation Parameters Upon Request 2. This process configures a separate navigational child window which displays user and transaction data. The window also provides navigation controls using a unique top tab and side tab navigation that is used to navigate among the system data 20. In addition to navigational controls and transaction data, the child window displays transaction commands which generally apply to the transaction as a whole, while commands specific to a particular transaction can be displayed on sub screens. The commands displayed and the ability to utilize the command may vary depending on the status of the data and operations on individual screens.

After preparing the Top Tab, Side Tab and Menuing 20 for use in the navigational structure, the system may request a Child Screen 30. The system uses a parent-child navigationally interactive screen structure to utilize a template approach that ensures the implemented structure is consistent and uniform. In an embodiment of that structure, the Child Screen 50 may use Application Frame 40 services by invoking them with the required parameters. Available services may include provide session mode upon request 60; provide navigation parameters upon request 62; provide transaction data upon request 64; provide control data upon request 66; and provide email services upon request 68. Using "provide session mode upon request" to illustrate, the child screen may allow the user to set or clear edit mode, preventing navigation during the edit. This would be utilized whenever the screen is performing some function which requires that the user not navigate elsewhere. For example, if a control screen contains a list of collateral items and one is selected for edit, the screen may want to remain in control and prevent other system navigation while the item edit is occurring, releasing the user only when the edit is complete.

Each screen contains Initialization, Save and Cancel functions that are made available to the Application Frame. This allows the Frame 30 to invoke the screen and instruct the screen when to begin any initialization. It also allows the frame, via the Save or Cancel function to notify the screen that a navigation request has occurred and the child screen is about to be closed, allowing the screen to be saved or cleaned-up.

When the Application Frame is invoked 2, it is supplied a session mode parameter by the system. It is this parameter which determines the Mode of the Session 22. Sessions modes may include Edit mode, View mode and Close Mode. Edit mode allows the user full access to editable transaction data. View mode allows the user to fully navigate the data, including selecting sub-screens from screen lists. However, while in View mode, the user is not allowed to modify the data. Close is a hybrid of both, allowing the user to view and navigate the data and allowing a certain subset of the data to be edited. Close mode allows the data to be updated without triggering rules which would require reprocessing of other steps. For example, in a commercial loan all data is gathered, validated, loan documents are prepared and the lender and borrower meet to sign documents, transferring the funds to the borrower. At the meeting the borrower delivers some required documents to the lender and it is discovered that some address information is incorrect on the location of a piece of collateral. The lender then makes some notations on the loan documents which must again be signed by the borrower. After the loan closing, the lender is required to return to the transaction and make those same changes in the system. However, in Edit mode, the rules would require re-preparing the loan documents. Close mode, however, would allow the changes without requiring the printing of a new set of loan documents Each screen that contains data or functionality affected by the Session Mode will Check the Mode 60 when the Application Frame generates a screen request 30 and based on the Session Mode, set a local Edit, View or Close mode. This will permit or restrict access to functions and data on the screen that relate to a particular Session Mode. Each screen also contains function to support accessing the various control data 66 and transaction data 64 housed within the application frame.

In addition each screen supports the Auto-Navigation process because when a screen is initialized, it first determines if any field navigation request has been made. If so, the requested field will be displayed.

After the Control Data has been retrieved 14, the system navigation is prepared in Prepare Top Tab, Side Tab and Menuing 20. The system navigation is designed to provide an easy menu to navigate two to three levels deep in a child screen or data hierarchy, displaying the layout clearly so that the user can readily identify the data or screen hierarchy. In one embodiment, the Top folder tabs 20 are defined to represent screen categories or in some cases single purpose screens that are themselves a major category. Side tabs provide the ability to drill into various screens which function as children of the parent screen or parent category.

Figure 11:
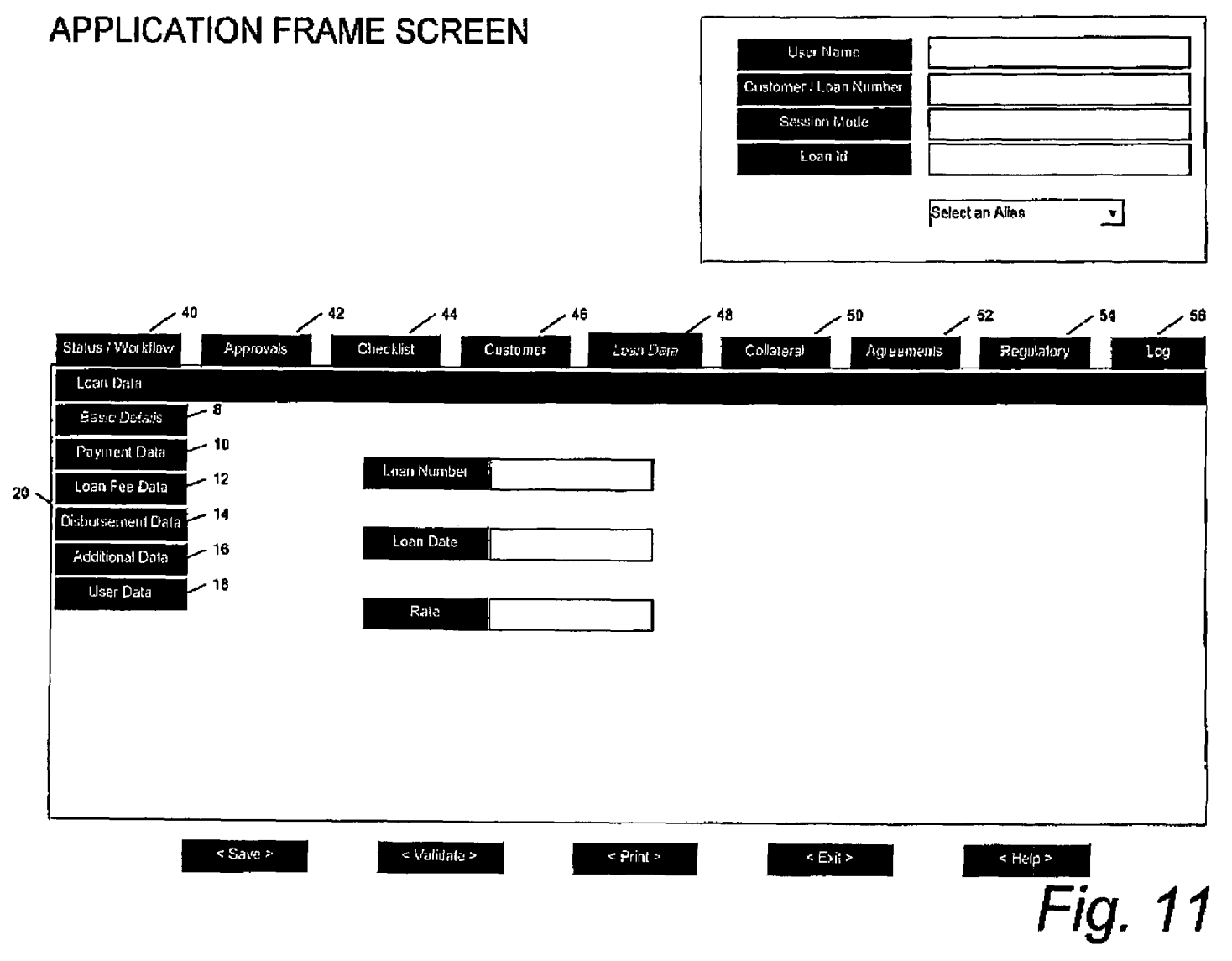

FIG. 11 shows a graphic display of the Application Frame of a financial system as an example. In FIG. 11, Loan Data Top Tabs 30 provides access to Side Tabs 20, which include Basic Details 8, Payment Data 10, Loan Fees Data 12, Disbursement Data 14, Additional Data 16 and User Data 18 and the window displays the Loan Data 48 Details screen. Each of the Side Tab 20 screens contains specific pieces of the basic loan data. A user can simply click from Payment Data 10 to Disbursement Data 14 and back to Basic Details 8 to navigate among the loan data. The Top Tab 30 and Side Tab 20 presentation makes it intuitively obvious that these data categories are related, together making up the basic loan data while Loan Data is within the same hierarchy as Collateral 50, Agreements 52, Regulatory 54, Logs 56, Customer 46, Checklist 44, Approvals 42 and Status/Workflow 40.

Each Top Tab 30 has a default Side Tab 20 associated with it that is usually the first Side Tab 8. When a user moves from one Top Tab 30 to another, the default Side Tab 8 is determined and the screen associated with the Side Tab 8 is invoked. When a user has previously visited a Top Tab 30 earlier in the session, the Side Tab 20 he was previously viewing is displayed rather than the default Side Tab 8 for that particular Top Tab 30.

Side Tabs 20 may be defined in menu groups so that the group of Side Tabs 20 associated with a Top Tab 30 can be identified and dynamically changed based on data input or other criteria. Side Tab menus can have Save and Cancel functions that restrict leaving the Top Tab data category until the set of data contained within the Menu's Side Tab is saved or canceled. This is typically used when an item has been selected for editing from a list, and the item has data categories that are divided up into separate screens each with its own side tab. It may be desirable or necessary to ensure that the edit of the item's data is treated as a whole unit. Navigation among side tabs may be permitted but the user may be prohibited from using the Top Tab navigation.

The purpose of the auto-navigation process is to provide a means for both external and internal functions, screens and others to view a specific application screen, identify a particular occurrence of a data group item to choose for editing, and specify a particular field for positioning the user when the screen and selected data are loaded. It is designed to support both the navigation that a traditional interactive user would require to navigate the various screens and functions of the system and to provide an automated way to navigate for the user. The system's auto navigation capability is a beneficial part of the overall system navigation.

Figure 12:
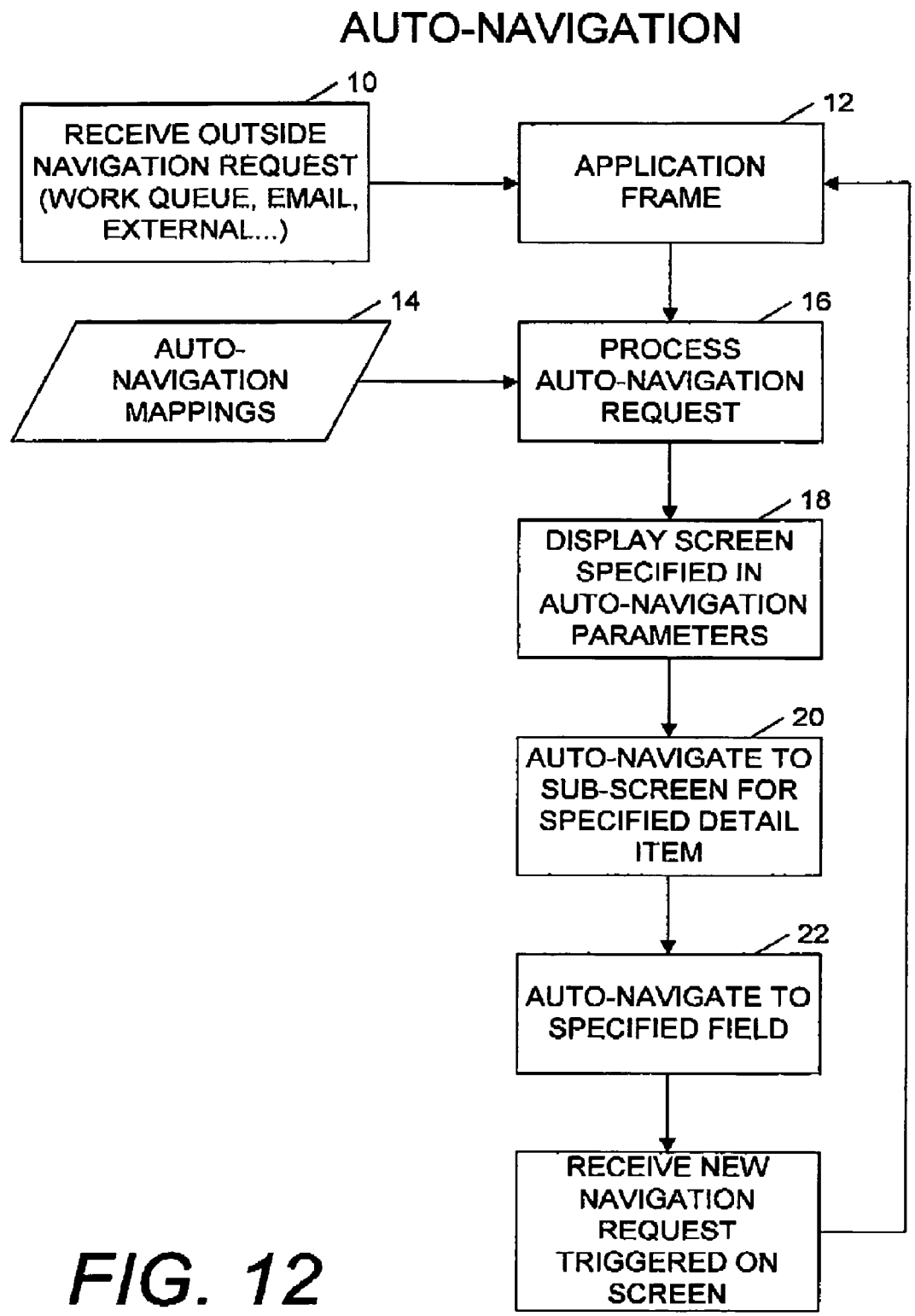
FIG. 12 is a block diagram of the Auto-Navigation process within the transaction workflow and data collection system.

As shown in FIG. 12, a request from outside Application Frame can generate a computer screen display request 10. To accomplish this process, all relevant screen graphics must be associated with unique identifying display fields. Before executing the Auto-Navigation request, a user navigates to the screen or screen-field of concern and executes the Email or request review function, embedding the unique identifying fields into the function routine. The user can then pass the information to a recipient who receives the embedded information. This receiver then communicates a request to the Application Frame 12 to Auto-Navigate, which includes a Mapping 14 of graphics within the system. Application Frame 12 then processes the Auto-Navigation Request 16 based upon comparing the supplied parameters with the mapped graphics. Once the Application Frame has determined which Screen is associated with the supplied parameters, the Graphic Screen is output to a display device 18. Auto-Navigation then navigates to the sub-screen 20 which contains the specific detail. Auto-Navigation can also navigate to the specific field 22, if the information was provided.

Application Frame also contains utilities which support the recording of status changes, data changes and events that occur during the life of the transaction. These events are recorded using a standard log function with date and time stamping, event type, event description and description attribute fields. To provide high level details and low level details, separate log functions may be provided to separate event log entries from detail change entries. In addition to events, errors may also be logged.

Figure 13:
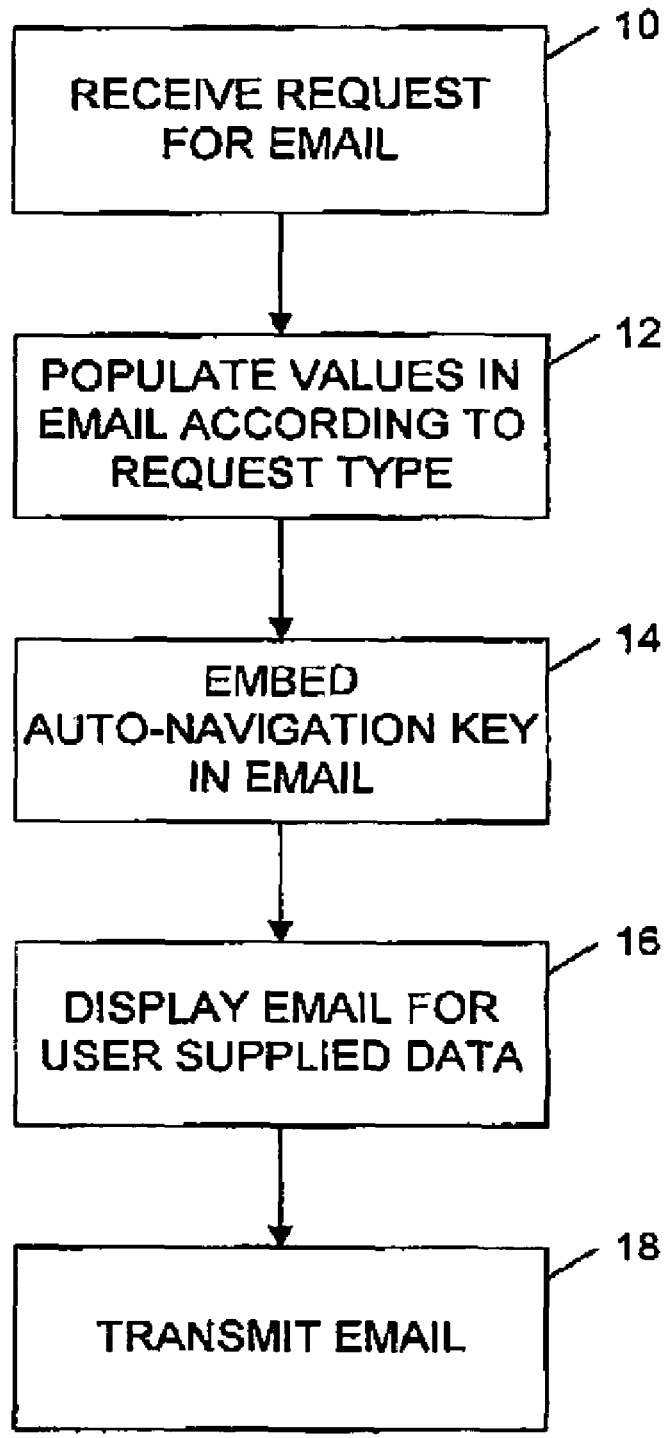
FIG. 13 is a block diagram of the Creation of Review Email process within the transaction workflow and data collection system.

Another useful function provided by the system is an email function for use within the system. FIG. 13 shows the Email Review Request process. The email process may be automated or populated manually. When the user selects to perform the Email function, the system generates a request for Email 10. This request results in a window appearing which allows the requestor to specify an email address or an employee id with the system supplying the necessary email address based upon a user id lookup feature 12. Based on where the request was initiated, the email function embeds Auto-navigation information into the email 14. If the email request was generated from a manually populated interactive window, the email 16 is displayed and the sender has an opportunity to review, modify, cancel or send the email. When the sender selects the send option, the email is transmitted 18 to the specific email address provided or the email address determined based on the user id.

The Employee/Workgroup features organize employee data into hierarchical structures called Lender Roll-up and Department Roll-up and use those structures to control access to application data and functions. Workgroups may be defined to control and automate work assignments based on work type and geographical data within the organization structure. Special functions include an Employee Type field that provides an easy ability to identify an employee and their hierarchy position, and a Team (workgroup) Assignment field that assists in controlling workflow assignments to workgroups. In addition, standard employee data is stored along with transaction data such as approval limits. The Employee/Workgroup process can be described in three main categories, Lender and Department Rollups, Work Assignment and Employee Type field.

Figure 14A:
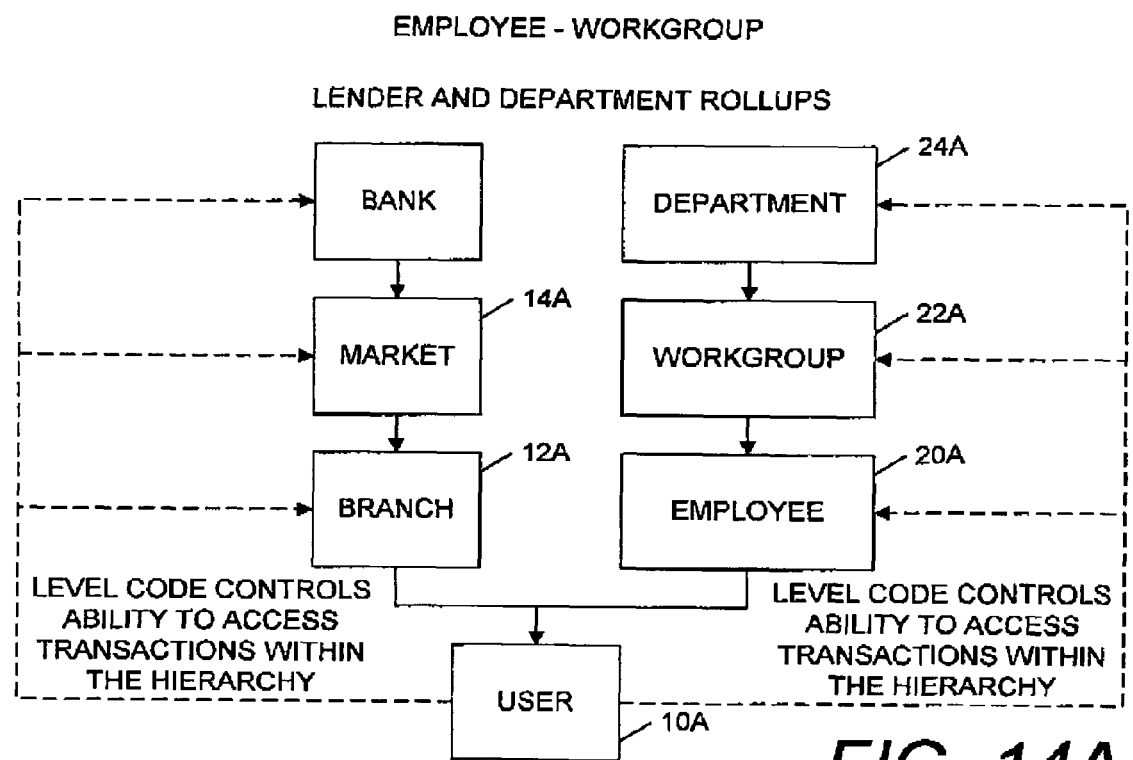
FIG. 14A is a block diagram of the Lender and Department Rollups within the Employee-Workgroup process of the transaction workflow and data collection system.

FIG. 14a shows the Lender and Department Rollups. Within a financial institution, User 10 may be assigned to either the lender roll-up or the department roll-up. First the User 10a may be designated according to the level to describe how far up the institution's hierarchy the employee has access to transaction data. The hierarchy is used in conjunction with the Work Queue Roll-up filter to control access to transaction data. Through the User's level 10a, a lender and a lender's assistant are allowed to see only transactions within their Branch 12a and a senior lender is allowed to see transactions within their Market 14a. Each employee is also assigned a user type which can include lender, lender's assistant, senior lender, doc prep services, doc prep supervisor, accounting manager, accounting servicer, accounting supervisor, doc prep manager, collateral servicer, collateral supervisor, collateral manager, legal staff, credit admin staff, complaint staff, audit staff, loan admin staff and others as configured. These user types are utilized within the system to turn functions on and off as applicable. For example, a Lender can perform the Submit to Doc Prep, but a Legal Staff does not see the function. Similarly, Doc Prep can Export to Laser pro but a Lender cannot. Numerous functions throughout other sections of the document.

In addition, cross-references are built which associate the user or user type with attributes specific to special functions. In particular, a cross-reference is used to relate the Workgroups 22a to the Employee 20a that serves as representative for the workgroup (usually a supervisor). This cross-reference is used in work assignments. In addition, cross-references link the Departments 24a to the workgroups that perform work for them. An example of how this is used would be a Doc Prep Department 24a where loan preparation is handled by teams organized by the cost center or Department 24a they support. A cross-reference links work types to the Workgroup 22a or Employee 20a that performs the function. An example of how this is used would be a Collateral Department 24a where work is organized by type rather than geographically. By providing the work type and the workgroup link, the team assignment function can easily determine the Workgroup 22a for a supplied work type and then use the workgroup-representative cross-reference to assign the work to an Employee 20a.

Another example which has more general application than the financial institution is the approval function. In the Approval function, a set of cross-references support determining the approval limits for a Standard Approver and a Senior Approval type. One cross-reference links Employees to Approval limits. A second cross-reference links Employee Types to Approval limits. The Employee-Approver limit is checked first and if an entry is found it applies, if not the Employee Type Approval limit is checked to determine the approval limits. This process is easily adapted for other cross reference lookups as used throughout the system.

Figure 14B:
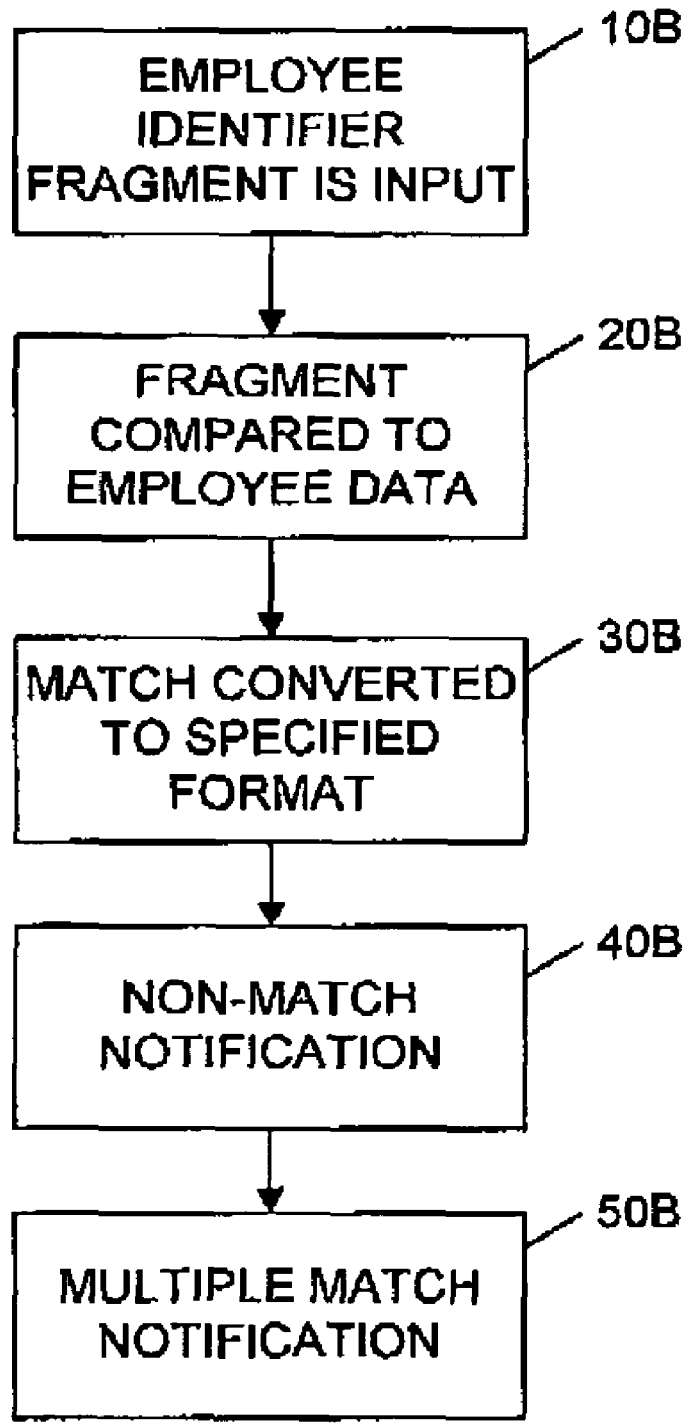
FIG. 14B is a block diagram of the Employee Type Field within the Employee-Workgroup process of the transaction workflow and data collection system.

FIG. 14b shows the Employee Type Field. The employee type field allows a user to enter employee identifying information into an input field in either employee name or employee number format, have that input verified and corresponding employee information located. Optionally the input could be reformatted into the default format for the field. For example, an employee type field may be designated as employee number format. A user may only know the employee name. The user begins to enter the name of the employee into the system 10b, such as "Sm" for "Smith, B." As the information is entered the fragment of the name is compared to the Employee Data 20 to search for a match. If a match is found the employee information is retrieved and the field's content, "Smith, B" is converted to the specified format 30b such as employee number, social security number, company name. If no match was found the user is notified 40b that the search was unsuccessful or if more than one match was found the user is notified of multiple results 50b and may continue to add additional information such as "Smith, Bi" and the system can now identify Smith, Bill from Smith, Betty.

Figure 14C:
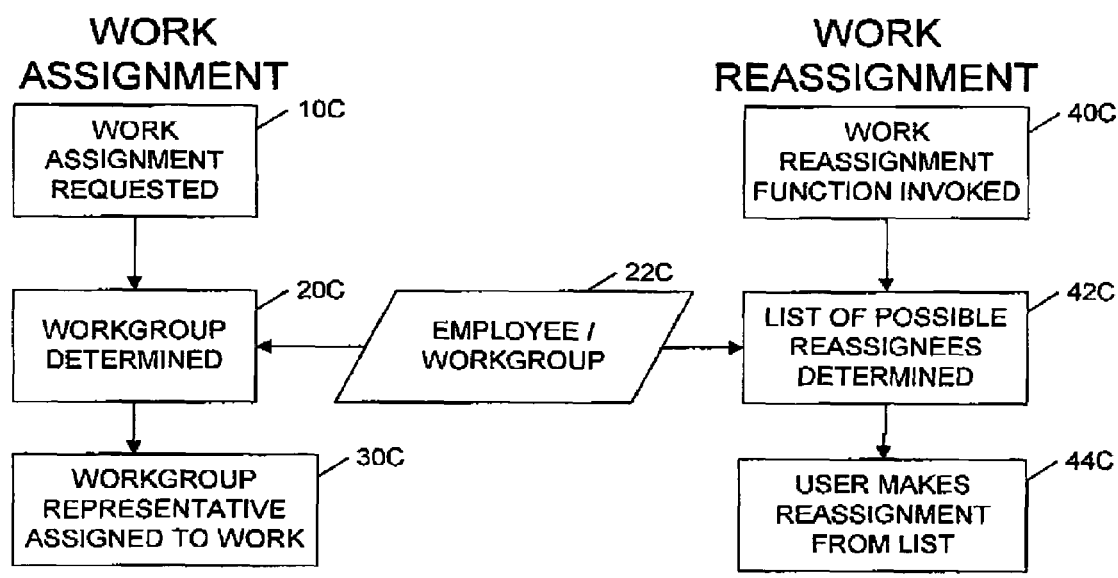
FIG. 14C is a block diagram of the Work Assignment and Reassignment within the Employee-Workgroup process of the transaction workflow and data collection system.

FIG. 14c illustrates the Work Assignment process within the Employee/Workgroup process. The Work Assignment function is available for each department associated with a specific task in the Workflow process such as Legal Review or Accounting. When system process are executed they assign work to a particular department with a Work Assignment process. When this needs to be done, the Work Assignment function is invoked 10 and given information in return for the function to retrieve information. The function is informed what cost center or work type and the department is of interest and then it gathers information associated with the items of interest such as the department, work type, workgroup lookup or other information as configured.

The Team Assignment function then checks the appropriate cross-reference to determine in which workgroup the work belongs 20c. The function then the collects the employee data from Employee/Workgroup 22c to retrieve all employees in that workgroup. It also collects the name of all other workgroups within the department. Team Assignment then determines the workgroup to representative cross-reference to determine which employee is the representative for that workgroup 30c. All of this information is then returned in list form, to the initiating party who receives the team employee data, list of teams and team representative. The workgroup representative is then assigned as the assigned-to field so that when the representative reviews the transaction they are able to assign the transaction from the list of team members. While that team member is working on the transaction, they have the ability to assign the transaction back to the workgroup representative; however, they are not allowed to assign the transaction to anyone else.

The workgroup representative also has the ability to Re-Assign the transaction to another team within the department by invoking the Work Re-Assignment function 40c. The lookup process then determines the other teams and the associated representative within the same department/workgroup and compiles a list of possible Reassignees 42c. The workgroup representative can then re-assign the work 44 to the other team by selecting the new representative as the assigned-to field.

The Status process maintains and displays the current status of a transaction as it moves through the various workflow points in the transaction lifecycle. Status maintains and displays information that reflects the current status and the key events and checkpoints in the transaction workflow. Commands are also available to execute functions, which perform some action changing the transaction's status. Work Assignment functions are available to manage transaction assignments within the departments and an event history screen is displayed which communicates information about the events, communications and data changes that have occurred to the transaction.

Figure 15:
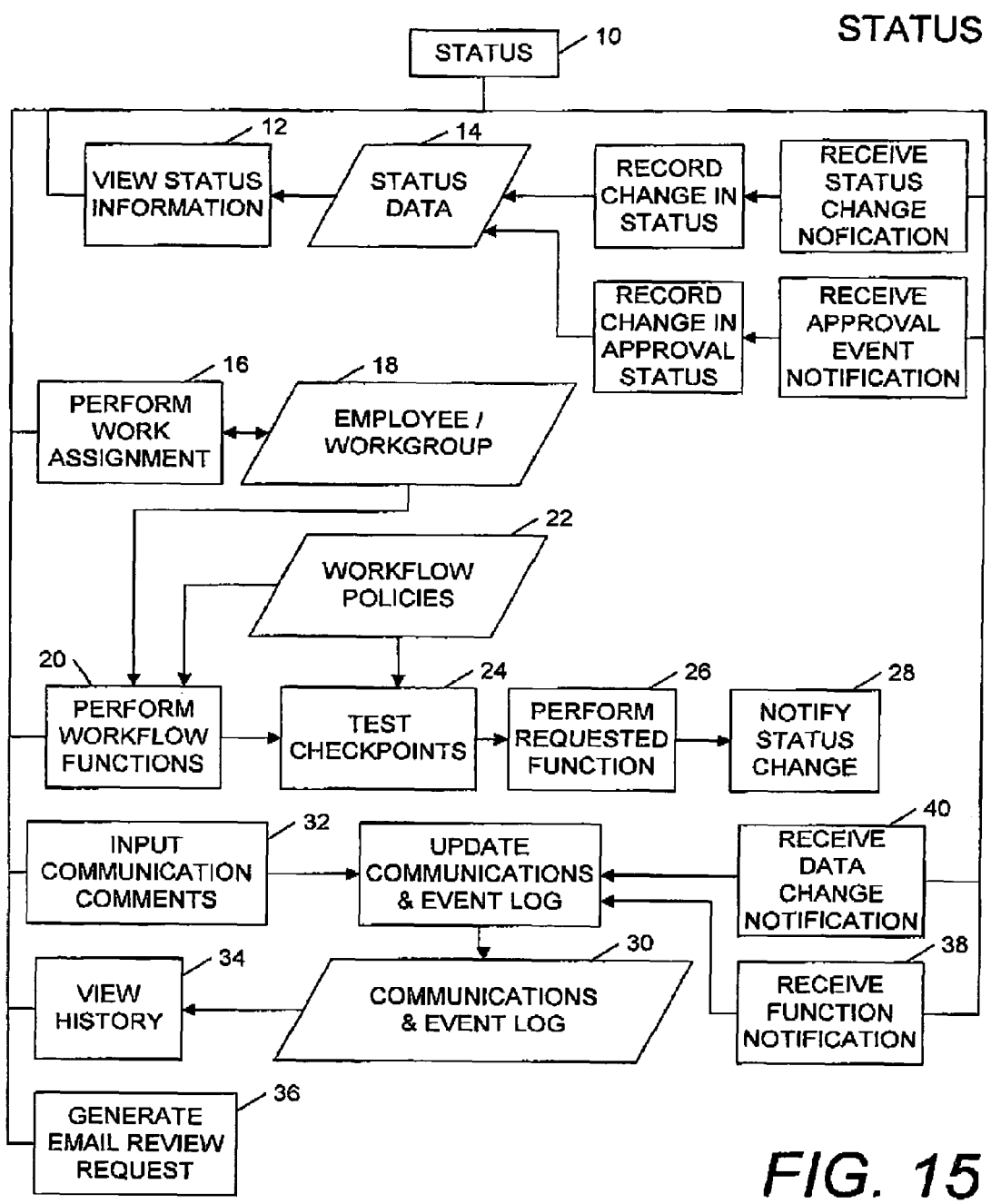
FIG. 15 is a block diagram of the Status process within the transaction workflow and data collection system.

FIG. 15 shows a detailed view of the Status process. When a user or the system invokes the Status screen 10, information is provided about the loan id of the transaction in question or the status data 14 is accessed. If a transaction id is supplied, the required status data is retrieved using the supplied transaction id before responding to the user or system's request. If the request is to View Status information 12, the Status Data 14 which is the resident control data is formatted for presenting. Lists are enabled, lookup codes are converted to literal values and default settings are configured along with other formatting and presentation functions.

Work Assignment Functions 16 are also set to enable or disable access based on the user settings in Employee/Workgroup 18 as determined by the user id or user type. If the user has authority to Perform a Workflow Function 20 the user can perform a process which assigns the transaction from one person to another person based upon the Workflow Policies 22.

One method to perform the Workflow Function 20 is to gain access to the system and establish that the user has authority to perform a Workflow function and evaluate the function availability. Then the system identifies a transaction, evaluates the current transaction status and determines which functions are available based upon the Workflow Policies 22. Next the system decides the appropriate transaction workflow step in a set of potential steps. This may be accomplished by testing the Checkpoints 24 to determine if Submit to Doc Prep, Forward to Legal Review, Return to Doc Prep, Reject to Lender, Ship Documents, Close, Move to History functions are available and enabled. If all functions are available, the system then checks to see which function was selected and processes the transaction accordingly 26. After initiating the requested function, the system monitors the status and generates a status change 28 based upon executing the requested function. The status is changed in response to function availability, the performed functions and the current status so that the Status reflects whether prior actions have resulted in a portion of the transaction workflow process being completed.

Using the loan transaction as an example, a series of statuses are defined which identify the major steps in the loan process and represent a handoff of work from one process to another. Each status indicates who is responsible for the next action on the loan. Statuses change when workflow functions are performed. Each workflow function may perform some actual task or may simply change the status to signify completion of the work represented by the current status. This logically "forwards" the transaction to the next process in the workflow sequence. An actual transmittal to the process may not even occur; however, the change in status will allow the Work Queue or other queries to display the transaction in a Work Queue List of a party responsible for a "next" process.

A series of workflow functions is defined to move the transaction from one status to another as it progresses through the transaction life cycle. Availability of each function is dependent on factors such as the user type, the current status, the validation state and other data. Each function sets the transaction to a new current status, which generally causes it to be directed to a new party responsible for the next piece of work on the transaction.

Status provides information on system events in the form of a Communications & Events Log 30, which includes the status of all critical steps completed and uncompleted, the overall status of the transaction and the associated approval requirements. In the Communications & Event Log 30, the system provides improved communication facilitates by allowing the Input of Communication Comments 32 which can be displayed in the Communications & Event Log 30 arranging the comments along with the events that transpire for viewing. In addition, the system provides a View History screen 34 which displays the history of the status of the transaction. Also the system allows users to Generate Email Review Requests 36, emailing information to a specific individual base on user id or email address. In addition, the transaction status is updated when it receives Data Change Notification 38 or Function Notification 40.

Figure 16:
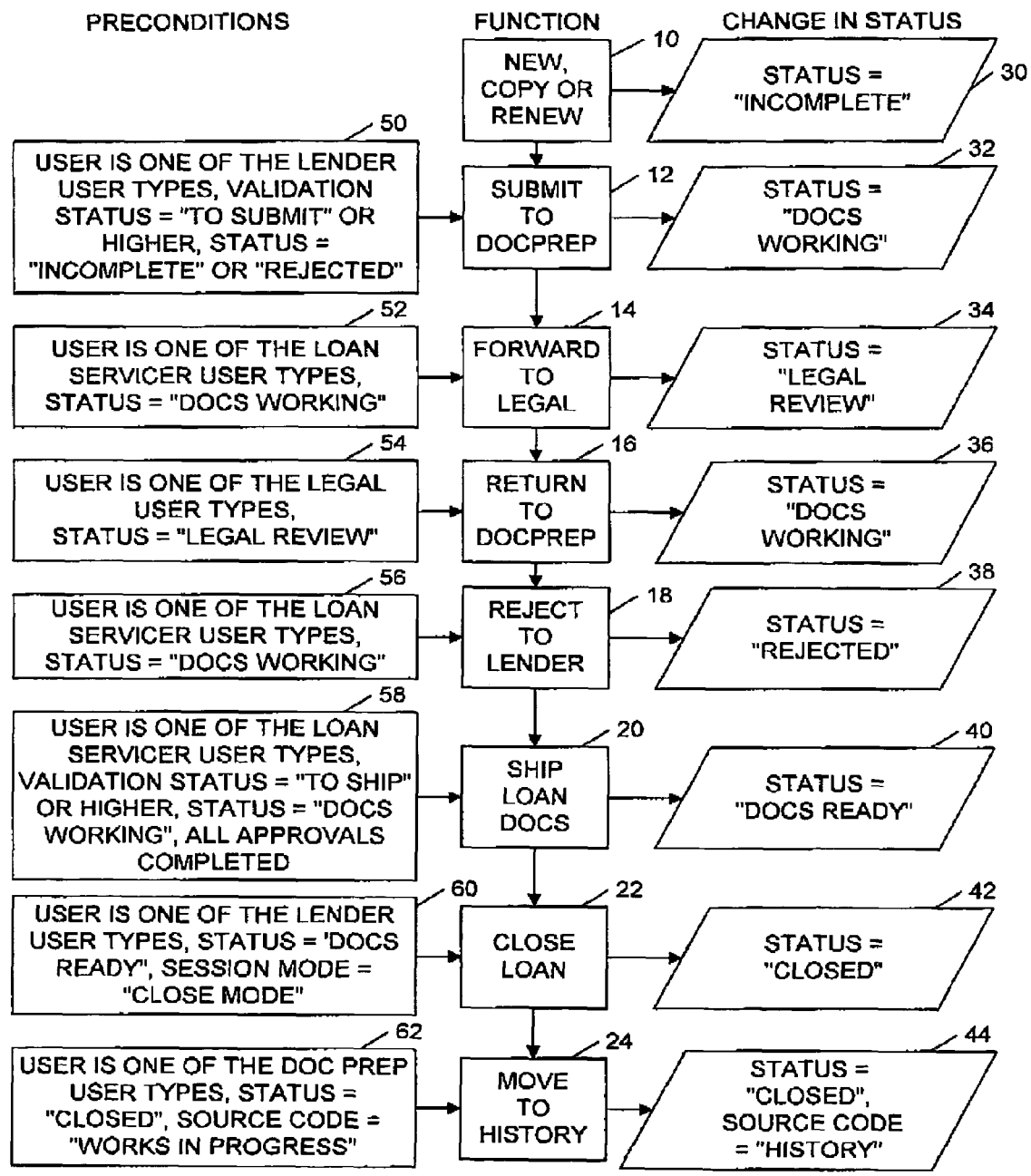
FIG. 16 is a block diagram of an illustration of a Workflow Example within the transaction workflow and data collection system.

FIG. 16 continues with our earlier example of a Financial Transaction. When the loan is first created 10, the status is set to Incomplete 30. When the loan data has been input, a lender user type (lender, lender's assistant, senior lender, etc.) uses Submit to Doc Prep 12 to send the loan to the loan servicing document preparation department for the loan documents to be created. This function is only available when the user is a lender user type, the validation status is To Submit or higher, and the current status is Incomplete or Rejected 50. The current status is changed to Docs Working 32. When a legal review is required, a loan servicer user type (servicer, supervisor, department manager) uses Forward to Legal 14 to send the loan to the legal department. This function is only available when the user is a loan service user type and the current status is Docs Working 52. The current status is changed to Legal Review 34. When the legal review is completed, a legal user type uses Return to Doc Prep 16 to send the loan back to the documentation preparation department for further processing. This function is only available when the user is a legal user type and the current status is Legal Review 54. The current status is changed to Docs Working 36. When the loan has issues that prevent completion of the loan documents, a loan servicer user type uses Reject to Lender 18 to send the loan back to the lender for correction. This function is only available when the user is a loan service user type and the current status is Docs Working 56. The current status is changed to Rejected 38.

When the loan documents are completed, a loan servicer user type uses Ship Loan Docs 20 to send the readied loan back to the lender. This function is only available when the user is a loan servicer user type, the validation status is To Ship or higher and the current status is Docs Working 58. Also, any required lender, senior lender, legal or other approvals must be completed 58. The current status is changed to Docs Ready 40. When the loan closing has occurred, a lender user type uses Close Loan 22 to send the loan back to the documentation preparation department for post closing processing. This function is only available when the user is a lender user type and the current status is Docs Ready 60. Also, this function is only available when the session mode is Close Mode 60. The current status is changed to Closed 42. When a loan has completed the front-end processing, a loan servicer user type uses Move to History 24 to remove the loan from Works in Progress transactions and move it to History transactions. This function is only available when the user is a doc prep user type, the current status is Closed 64 and the source code is Works in Progress 62. The source code is changed to History 64. Different or additional functions can be built to support moving the loan to back-room servicing in Accounting, Collateral, Compliance, Credit Review, and other departments and statuses designated to reflect that workflow.

As can be seen from the proceeding example other statuses are available and the criteria used to govern workflow function availability are easily adjusted. In addition, the workflow function is not limited to a loan transaction and can be utilized on different complex workflow systems with different rules or restrictions applied to the workflow process.

Figure 17:
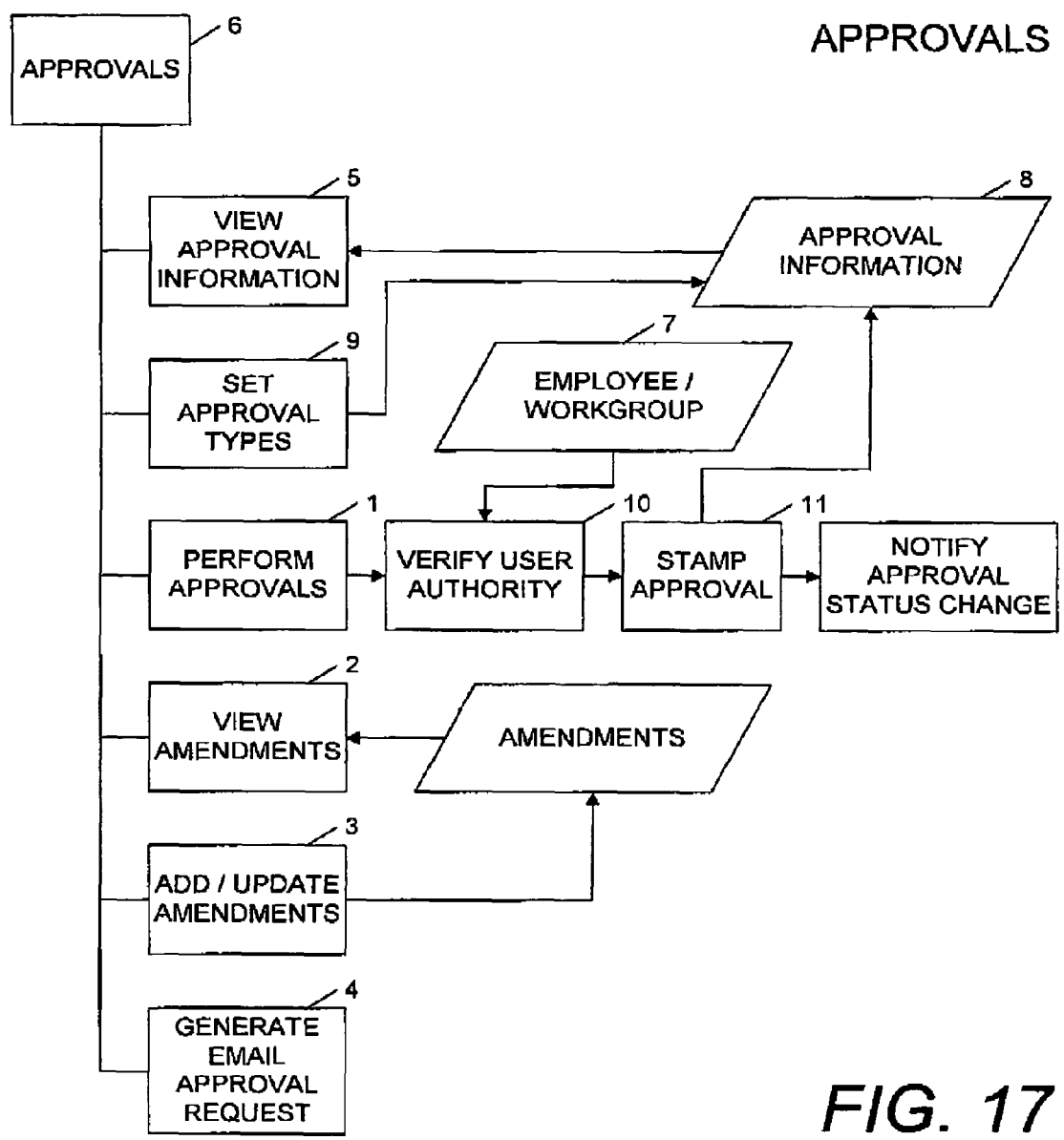
FIG. 17 is a block diagram of the Approvals process within the transaction workflow and data collection system.

FIG. 17 shows the Approval Process. The Approvals process allows the user to create an approval policy for requiring certain loan transactions to obtain certain approval types by specifying the type of approval needed and imposing rules specific to each approval type. Within Approval, requests may be generating using the imbedded Perform Approvals 1 functions on the display screens which allow approvals to occur within the Application Frame system. Additional functions supported by Approval include View Amendments 2, Add/Update Amendments 3 and Generate Email Approval Requests 4. The Approval process is comprised of an Approval 5 screen that manages the initial approval process, a set of Amendment screens that are used to process amendments after initial approval and Email screens that support requesting an approval from a senior approver.

The Approval process begins when the system or user invokes the Approval 6 function and provides the system transaction data or a transaction id. If the transaction id is provided, the approval transaction data is retrieved using the supplied transaction id before proceeding. The system data is loaded including the User Settings from the Employee/Workgroup 7 processes. After invoking the Approvals 6 and the transaction data is loaded, the system retrieves the Approval Information 7 and formats the Approval screen data allowing the user to View Approval Information 5. The user then has a choice to Set Approval Types 9, Perform Approvals 1, View Amendments 2, Add/Update Amendments 3 or Generate an Email Approval Request 4. If the users selects Set Approval Types 9, the user can chose between Standard Approval, selecting Senior Approval or selecting Committee Approval. If the User selects Standard Approval, the Senior approval and Committee Approval screen areas are disabled and the Approval Type is set to Standard Approval, and the Standard Approval Status is set to Pending with Senior Approval Status set to N/A. If the user selects Senior Approval, the Standard and Senior Approval fields become enabled and required, and the Committee Approval screen is disabled or hidden. The Approval Type is set to Senior Approval and the Standard and Senior Approval Status are set to Pending. Likewise if the user selects Committee Approval, the Standard and Committee Approval become enabled and required, and the Senior Approval is disabled or hidden and the Standard Approval Status is set to Pending and Senior Approval Status is set to Committee Approved. Setting the Approval Types 9 causes the approval types to be transmitted to Approval Information 8, which is then transmitted to View Approval Information 5 for displaying. If the user decides to Perform Approvals 1, the user type is checked to ensure the user has the appropriate authority to approve the transaction. If the user does not have proper authority to approve, the action is terminated with an error message and the View Approval Information 5 is continued. If the user has proper authority, the user id is checked to make sure the approver is either the originator or associate originator for the transaction. If it does not match then the office id is checked to see if the user has the authority under the office if the office is the originator or associate originator for the transaction. If neither the user id nor the office id match, the action is terminated and the View Approval Information 5 is continued. If either the office id or the user id matches, the system verifies User Specific Authority 10 limits to determine if the user has sufficient authority to approve the transaction. If no restrictions are found the transaction is Stamped Approved 11 and the Standard Approval Status is set to Approved with the change in status being communicated to Approval Information 8 and the Approval is logged by the system's event logging function with a user id, date and time stamp being recorded in the Notify Approval Status Change 12.

If the user decides to View Amendments 12, the Amendments Selection screen data is formatted for presentation and viewed based on the transaction Amendments. If the user decides to Add an Amendment 3, the amendment data is checked to determine if there is an outstanding amendment and if there is, the Add Amendment function 3 is terminated with an error message. Otherwise, if the user has approval type of Senior Approval or Committee Approval, the Senior Approval Status and the Amendment Status are both set to Amendment Pending and the Amendments Screen is invoked without amending the data. One way to save the Amendment is to invoke the Amendments Screen in which the user can cancel or save the pending amendment. Within the Approval process the user also has the ability to Generate an Email Approval Request 4 in which an email is created and sent to a user based on the user's email or user id. The Auto-Navigation parameters are imbedded in the email to allow the Approver to quickly and automatically go the specific field where he can approve the transaction.

Figure 18:
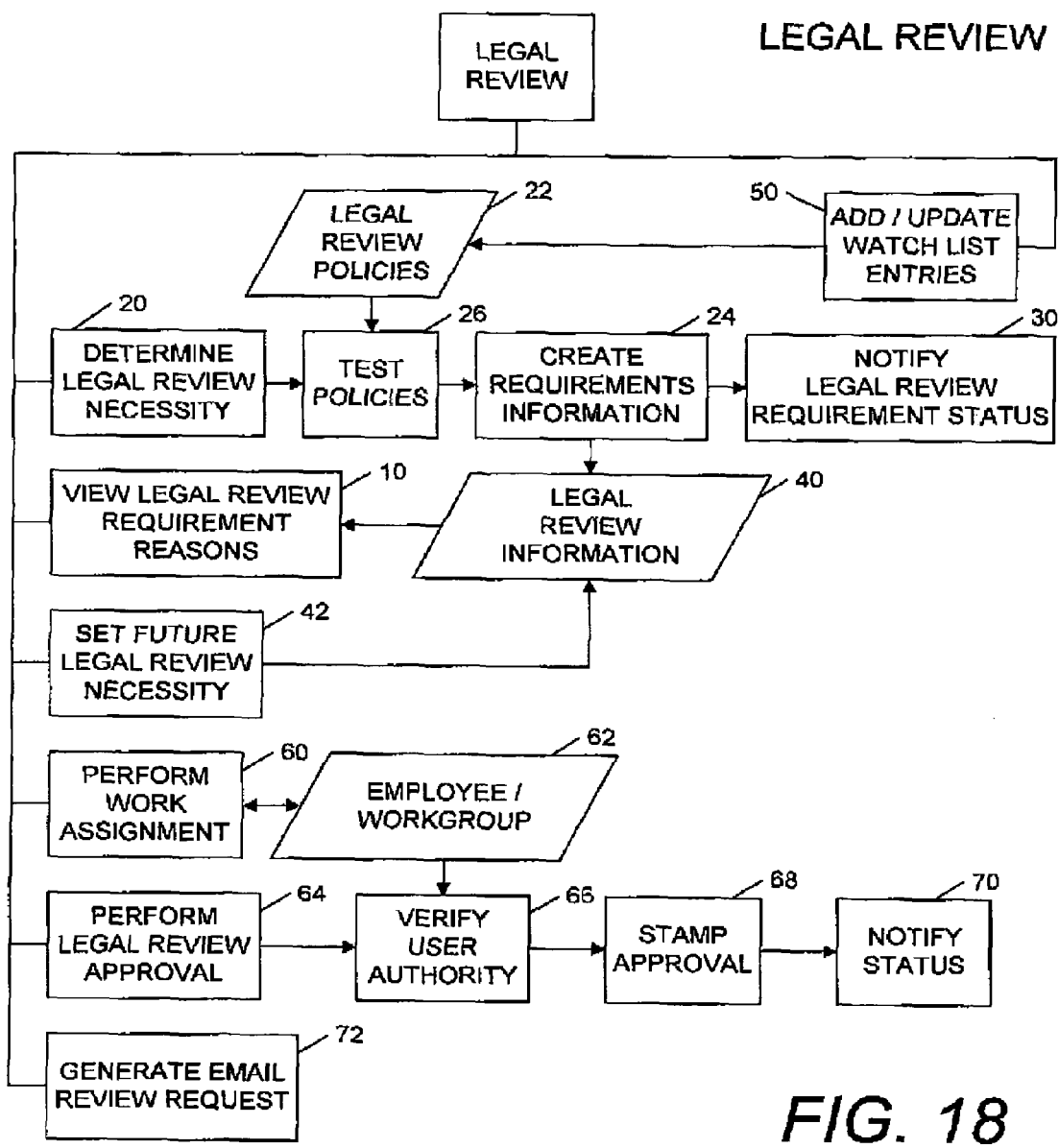
FIG. 18 is a block diagram of the Legal Review process within the transaction workflow and data collection system.

FIG. 18 depicts the Legal Review Process which provides the ability for an institution to create a legal review policy for requiring certain transactions to receive approval from qualified reviewers from the legal department before the transaction can be completed. The rules may be configured based on the transaction data content or a configured watch list. Rules can also be created for a specific transaction or a specific customer. Like many approval processes, a Legal review request may be generated using the system's email function coupled with the Auto-Navigation function. The legal review process accomplishes these features through three main functions, the Legal Review rules engine, the Legal Review screens and the Watch List function and screens.

The legal review rules engine or the Legal Review Requirement Reasons 22 are a way of housing the rules which can trigger legal review. The need for legal review can be triggered by several different conditions. The transaction data content may trigger legal review when tested against the rules that are built in the legal review rules engine. Typically, the user may select the option to request a legal review, the transaction may fall within the watch list criteria, or the transaction may be a renewal of a previous transaction upon which the legal department had selected the option to review the transaction upon any renewals of the transaction.

The Legal Review Requirement Reasons 10 function allows the Testing of the transaction data 26 against each rule encoded in the Legal Reviews Policies 22 and prepares a list of the rules, Create Requirements Information 24, that trigger legal review. If legal review is not needed the requestor receives a failure report. For each rule that does trigger legal review, attribute information is retrieved which describes and explains the rule. Additional attributes are retrieved for use in the Auto-Navigating feature on the system. The Auto-Navigation method is described in the Application Frame process. Once the need for legal review is determined, flags are set to reflect the condition, and the Legal Review Requirement Status is Notified 30.

If the institution has defined a watch list, it is consulted to determine if the particular transaction falls under watch list rules criteria, either by the account, the specific transaction, or other criteria defined in the watch list. Once the need for legal review based on watch list is determined, flags are set to reflect the condition and the Legal Review Requirement Status is Notified 30.

If the user has requested legal review or if the transaction is a renewal marked for review, Test Policies 26 will be used to determine what the Requirements are and Create Requirements Information 24 which will then Notify Legal Review of the Requirement Status 30. In addition, Create Requirements Information 24 will also set flags within Legal Review Information 40 to reflect the condition and update the View Legal Review Requirement Reasons 10.

View Legal Review Requirement Reasons 10 is associated with the legal review screens, which provide a means to invoke the legal review rules engine, allowing a user to set legal review requirements and signify completion of the review. It displays the current status of legal review in addition to each review category's status. Within the View Legal Review Requirement Reasons 10, the user can select an individual legal review item and display the details that triggered legal review along with the attributes associated with the category type. At this point the user can select a rule and Auto-navigate to the transaction data within the system.

In addition to the Legal Review Policies 22, which determines when a transaction should be reviewed, the Watch List also determines when a transaction should be reviewed by the legal department. The Add/Update Watch List Entries Screen 50 is where the Watch List conditions are entered.

The Watch List engine provides a means for an institution to develop a watch criteria for transactions which, if satisfied, causes review and approval of the transaction by the legal department. Rules are built through the watch list screen, Add/Update Watch List Entries 50. Watches may be specified by customer number, by customer number and transaction number and by industry. When specified by customer number, additional criteria may be available to specify which customer types to apply the watch. The Watch may be applied to all customer types or it may be applied to a specific type or the first customer entered. A watch can also be caused based on legal department review, and the imposed requirement of future review which is set by Legal Review Necessity, 42. A watch can be limited to a beginning date and an expiration date and can have a comment field associated with it to identify the reason for the watch. When Add/Update Watch List Entries 50 is invoked, it allows for the creation of rules which are integrated into the Legal Review Policies 22 which are used to Test Policies 26 against transaction data.

Add/Update Watch List Entries 50 allows the user to add a new watch rule or select an existing watch rule to update. A user can add a new watch through the Add/Update Watch List Entries 50 screen by specifying the criteria that cause a watch to occur. In addition the user will set an effective date and expiration date, although an open ended watch is possible by not adding an expiration date. When a new watch is added, the user id and date and time is recorded to document the user that placed a watch and when it was placed.

Within the legal review, a supervisor with the legal department can perform a workload adjustment through Perform Work Assignment 60. In this manner, someone with authority to perform the operation can select which legal review gets which transaction to be reviewed. In this way, the workload can be effectively managed by reducing and reallocating work among the reviewers. To perform the function the system determines if the user has authority based on the user settings within the Employee/Workgroups settings 62.

If a transaction requires legal review and the transaction has been assigned to a reviewer, the transaction appears in the reviewer's Work Queue. At this point the reviewer can select the transaction for reviewing, Perform Legal Review Approval 64. Once selected, the user's authority is then reviewed using Employee/Workgroup 62 user settings at Verify User Authority 66. If the reviewer has valid authority to review the transaction, the reviewer can approve or decline the transaction based on the details of the transaction. Once approval is granted, Stamp Approval 68 then the Status 70 of the transaction is modified to reflect the approval, and the transaction is removed from the Work Queue of the reviewer.

In addition to work needing legal review appearing in the Work Queue of the individual reviewer, a user can Generate an Email Review Request 72 where the user sends the reviewer the specific information allowing the review to quickly navigate to the approval field within a transaction. This is a similar function to the email Auto-Navigation function in Application Frame.

Figure 19:
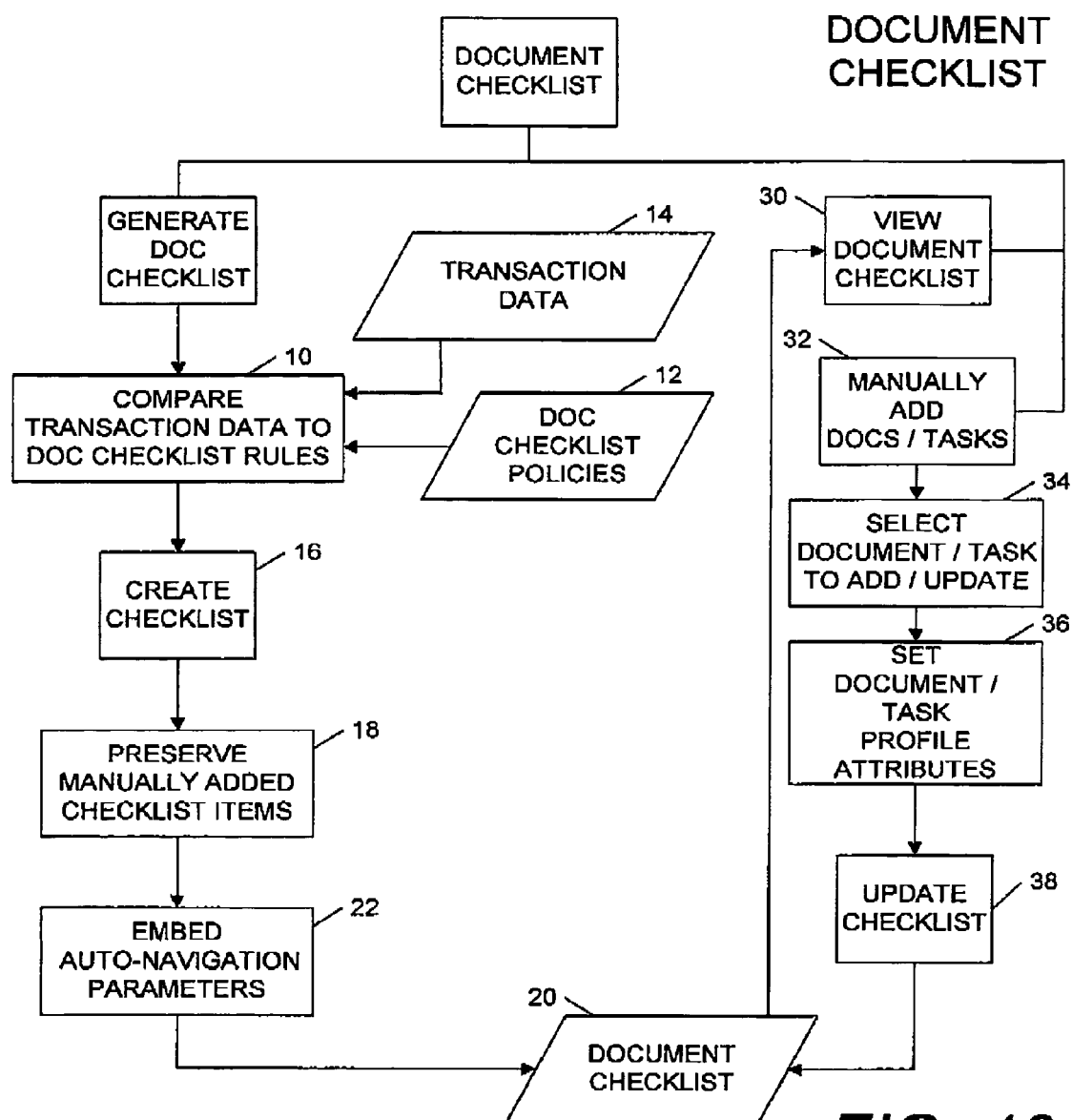
FIG. 19 is a block diagram of the Document Checklist process within the transaction workflow and data collection system.

FIG. 19 describes the Documents Checklist process. The Document Checklist process develops document profiles where the characteristics of the transaction documents and their timing within the transaction life cycle are stored. In addition, the process tests the transaction data against document profiles to determine which documents are relevant at a particular time. Document profiles are created and maintained specifying the characteristics of each document and a rules repository, which generates the Document Checklist by specifying the rules that determine when documents should be automatically added to the Document Checklist. The Document Checklist screen organizes the display of the checklist and provides the ability to record actions taken for each document and to manually add documents as needed. Note that while the term document is used throughout the process and the system, the term document is meant in the broadest sense and may include physical documents, a task, a task related to a document or any other action item on the transaction that has similar characteristics to those described below. Thus a particular document instance may in fact be a task of some sort.

The Document Checklist can be divided into two areas, the Compare Transaction Data to Doc Checklist Rules 10, which is a document checklist rules engine, which assesses the current application data against the document rules and procedures to produce a Document Checklist 20. The other area of interest is the View Document Checklist 30, which is a display which allows the user to view the document checklist in several different formats and perform workflow function to indicate the disposition of documents as they are received, waived, confirmed or otherwise handled. From View Document Checklist 30, the user can Add Docs/Tasks 32 manually, semi-automatically through Select Documents/Task to Add/Update 34 or through changes in the Profile Attributes 36.

A Document Profile Repository contains all standard documents and their characteristics. Each document profile contains attributes indicating the point in time the document is required and its requirement level, i.e. how stringent the requirement is, whether the requirement can be waived, along with any other document attributes. Additional attributes may indicate who has the responsibility to complete or collect the document, who has the ability to mark the requirement completed and the document ready or to waive the requirement and who is allowed to certify the requirement is fulfilled. By default, these assignments are specified by user type or department type, but may be specified by user id.

Document Checklist Policies 12 contains the custom rules associated with each document that describe in detail the criteria that controls whether a document is required. The Polices for a single document form a ruleset, consisting of a series of one or more rules that must all be true for a match to occur. Policies within the ruleset may also govern interdependencies between documents, e.g. the presence of one document may preclude the need for another document that might otherwise be required based on its ruleset criteria. Within the Document Checklist process, the user may also have the ability to review the natural language description of the rules governing the documents.

A rules processing engine collects the list of documents from the document Profiles repository, along with the Transaction Data 14 and tests the Transaction Data against the document profiles to determine which documents are relevant at a particular time in, Compare Transaction Data to Doc Checklist Rules 10. After testing, the results are used to Create a Checklist 16 for the particular set of Transaction Data 14. Document rulesets may result in multiple matches, and therefore multiple documents may be added to the checklist.

In addition to comparing data against policies, documents can be manually added to the checklist 18. The Document Checklist process then Embeds Auto-Navigation Parameters 22 into the created checklist items and resulting in the Document Checklist 20. The Document Checklist 20, once created, can be used for recording the relevant documents. It can also be displayed. View Document Checklist 30 displays the list of required documents for the particular transaction and important details about each document. This screen allows the user to manage the flow of documents through the system and the transaction lifecycle.

As described earlier, Document Checklist 20, can be created automatically based on loan data and document rules. Alternatively, users may Manually Add Docs/Tasks 34 to the Document Checklist 20. If the user manually adds a document, the user must Set the Document/Task Profile Attributes 36. The user may either add a document from a list of standard documents, or the user can specify and name a custom document. The user may then create the document's attributes, including when required, document type and other attributes. If the user selects Save, the document is added to the checklist data and control is returned to View Document Checklist 30. The user also has the option of canceling the action and the action to add or update task is discarded. The user may also remove a document or edit a document. Once the user completes his manual session, the system refreshes the document checklist data with the saved data. In addition, as transactional data changes, Update Checklist Function 38 provides an ability to refresh the Document Checklist 20.

The organization of the View Document Checklist 30 display screen allows the user to quickly understand the major data object that triggered the document requirements because the documents are organized by data categories, including General Documents, Entity Documents, Manually Added Documents and other document categories which could be easily added. Each category is further refined to the particular instance of the data object. The user is also allowed to customize the View Document Checklist 30 by other criteria such as who is responsible to collect the document, when the document is required, the current state, the document's waived status and other criteria.

Document instances are uniquely bound to the underlying data objects that resulted in the rules match, thereby guaranteeing that each document instance is uniquely identified and that any changes to data objects will properly be reflected in the Document Checklist 20. A final post-processing step resolves any interdependencies between documents. The completed document checklist is stored as a subset of the Transaction Data 14.

Figure 20:
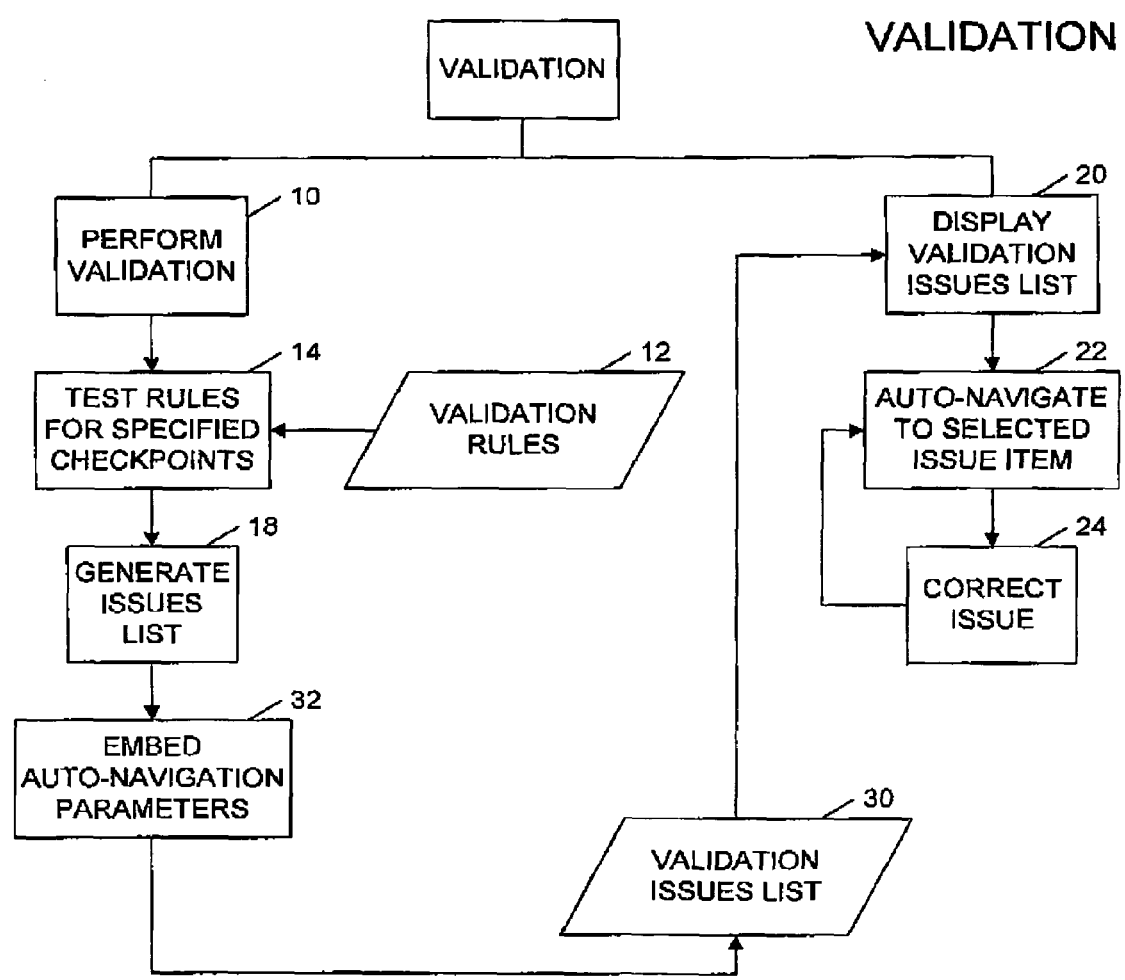
FIG. 20 is a block diagram of the Validation process within the transaction workflow and data collection system.

FIG. 20 describes the Validation process. Validation is a process that tests transaction data against business rules and produces a validation error list based on the test. In addition, Validation has a rules repository which contains the business rules, and their attributes contains the business rules and their attributes such as workflow checkpoints that determine when the data is needed and stringency levels that indicate how stringent the requirement is for the given checkpoint. Validation also produces an issue/error list, implementing the Auto-Navigation process to allow the user to address each issue, while the transaction to progresses through the transaction workflow.

When the user accesses the Validation process, the user has the ability to Perform Validation 10 or Display Validation Issues List 20. If a user has not Performed Validation on the transaction, the user cannot yet retrieve the Validation Issues List 30. To Perform Validation 10 the system supplies the transaction data, while the user selects which transaction to validate. Control data to support the system's Auto-Navigation feature is retrieved and a recordset is initialized to hold results of the validation function. Validation Rules 12 are retrieved for the specific checkpoint, the transaction or other criteria based on the requestor's instructions. Validation rules have attributes that indicate the requirements for the checkpoint or for multiple checkpoints along with a stringency level, e.g. Required, Preferred and Optional. The rules can define that at a certain checkpoint if certain rules are not met, the workflow process is stopped. Rules can also progress. In other words, if a rule is defined at one checkpoint to be Preferred for a later checkpoint, the rule can be required. When the Test Rules for Specified Checkpoints 14 is performed, the system checks the Validation Rules 12 once; however, each checkpoint that deviates from the specified rule may be reflected for each deviance. Rules can also be assigned to a specific user type or user id. After Test Rules for Specified Checkpoints 14, the process Tests Rules for Interdependencies 16. In this way, more than a single checkpoint can be combined to create a rule. As an example of the how the validation flow works, after the control data and transaction data are retrieved and a record set is initialized to store the results of the validation, the system may retrieve the Validation Rules 12 for a specific checkpoint, assignment or other criteria. Then the requested group of rulesets is processed, and each rule is tested for compliance with the rule by parsing each occurrence of the specified data object and discrete data element and comparing it to the supplied value, range of values, list of values or specified data element. When compliance is found with the first rule, each subsequent rule is tested using the same process until all rules have been exhausted and complete compliance is found and the ruleset processing is completed, or until a test fails for the rule. When it appears that the tested data deviate from a rule, then the rule attributes are stored as an Issues List 18 entry.

Corresponding information to describe the data element, the corresponding message and the rule condition are stored in the Issues List entry 18. The field values needed to support system Auto-Navigation to the field are also retrieved and Embedded 32 in the Validation Issues List entry 30. The Issue List is then returned to the requestor and displayed in the Display Validation Issues List 20. An alternative method may include hard-coding the validation rules profile data into the validation rules engine. Also, the system may choose not to support grouping of checkpoints.

When the user decides to Display Validation Issues List 20 and validation has been performed, the system displays the Validation Issues List 20. The list contains a listing of checkpoints which have issues. This list can be customized by the user. The user can update the validation, view the rules, or selectively focus on each issue within the issue list and Auto-Navigate to the selected issue item 22 using the Embedded Auto-Navigation 32 information. At this point the user, if allowed, based on the user type, can correct the Issue 24 and return to correct other issues within the issue list. The user also has the ability to exit the validation screen when he is finished, and the current validation list is stored for future use. Alternatively, the validation process may not support the storing of the validation list, the selective indication of the rules by checkpoint, the alternative screen organization or the textual display of the rules.

Figure 21:
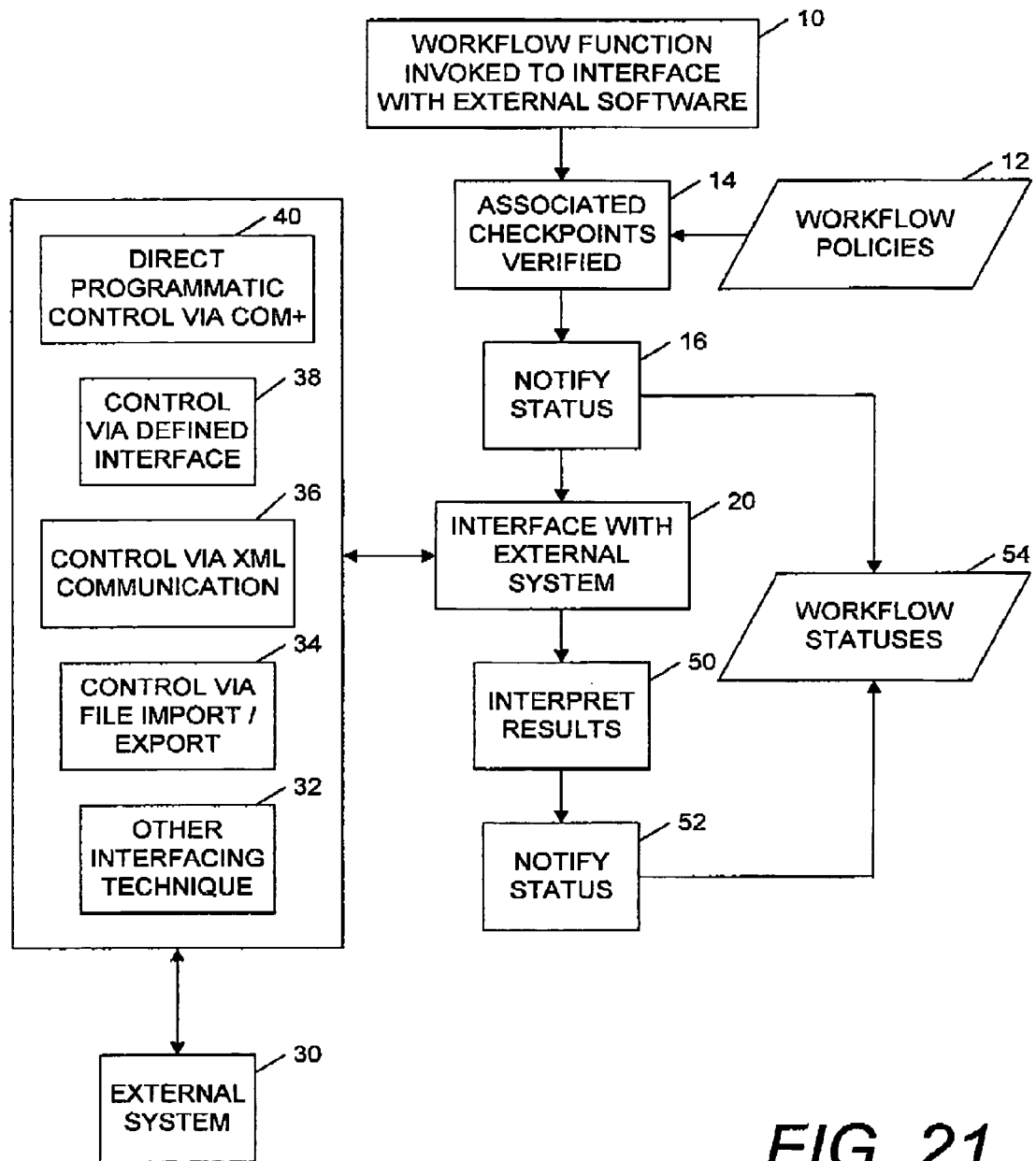
FIG. 21 is a block diagram of the Interface with External Systems process within the transaction workflow and data collection system.

FIG. 21 describes the Interface with External Systems. A significant problem in commercial transaction based systems is the lack of integration among the various systems performing steps in the processing. Interface with External Systems provides an interface between the workflow system and third party systems. The interface provides an ability to programmatically build new transactions and perform multiple updates to existing transactions. The interface between the systems may be configured for either single or two-way communication for reading from and/or writing data to third party systems. In two-way communications, the process uses a compare process that ensures that important data has not been altered separately by the third party system.

The interface is invoked by the Workflow Process 10, which establishes a communication interface with the External System 20. The Workflow Process 10, accomplishes this task by first integrating the established Workflow Policies 12 into the Workflow Process 10 and Verifying the Associated Checkpoints 14. During the workflow of a transaction, the workflow checkpoint may require that certain information be transmitted to third party systems. If the checkpoint requires information to be communicated to a third party system, the status of the transaction is Notified 16 that transaction information is being communicated to a third party system. At this point, the Interface process 10 interfaces with the External System 20 by establishing a communication connection, configuring the information in accordance with the communication parameters and communicating the information to the External System 20. Some examples of possible communication interfaces may include COM+40, Defined Interface 38, XML Communication 36, File Import/Export 34 or others 32.

Once the information has been communicated to the External System 30, if the External System allows for two-way communication, the Interface process Interprets the Results 50 of the communication to the third party system. If the external system does not provide for two-way communication, the Interface process 50 interprets the lack of results from the third party system. At this point the Interface process Notifies Status 52 of the Interpretation 50, and the Workflow Status 54 is updated.

Figure 22:
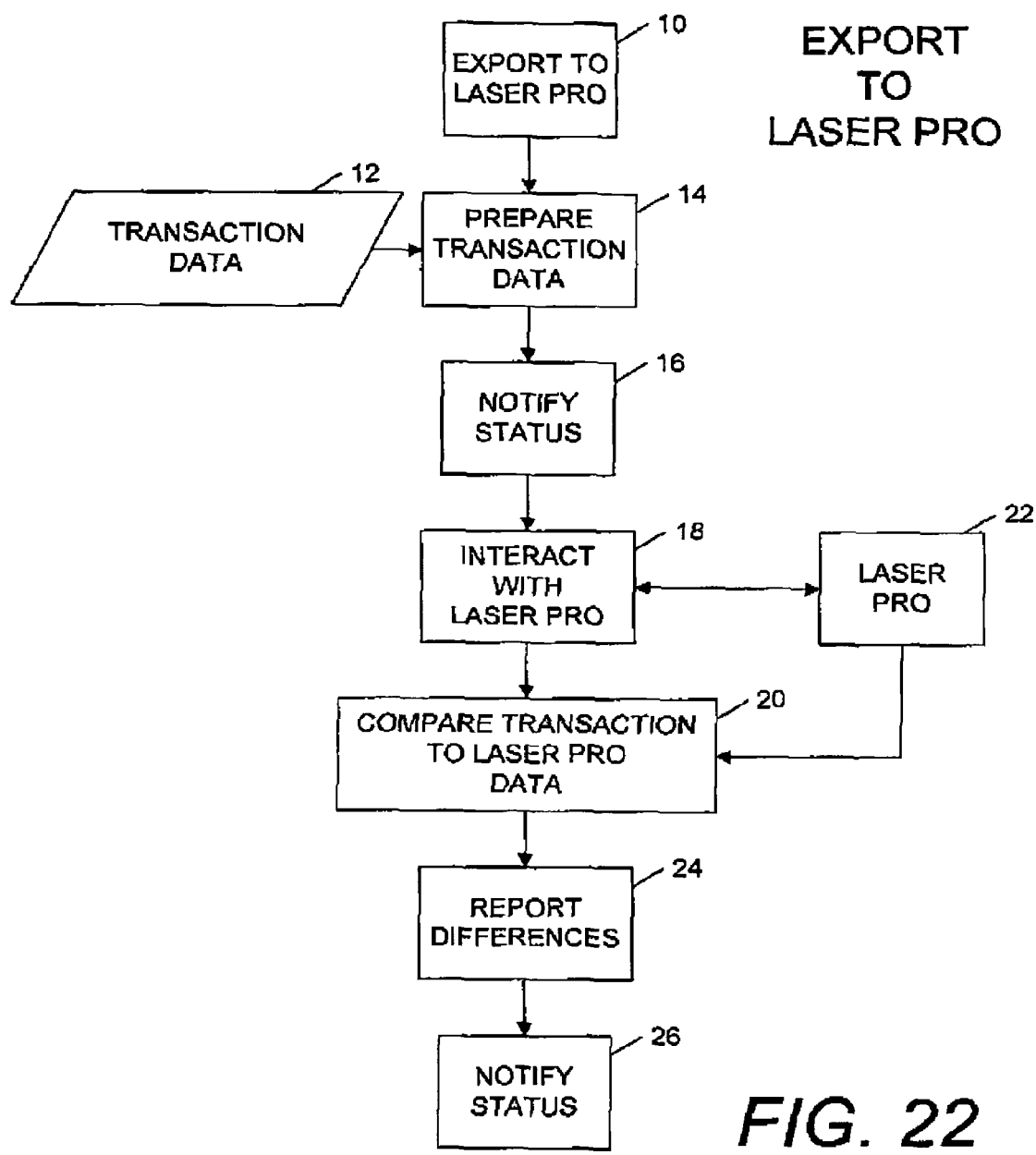
FIG. 22 is a block diagram of the Export to Laser Pro process within the transaction workflow and data collection system.

As an example, in a commercial loan transaction, FIG. 22, illustrates the Export to Laser Pro process. In FIG. 22, the System calls the Export to Laser Pro 10 process either in response to a user request to export or based on some other request. The process gathers information for a loan transaction from Transaction Data 12 for the purpose of preparing transaction documents. A conversion of code values to literal string values is performed by utilizing control data conversion tables which store the literal string value corresponding to each field's possible code value. This conversion is performed for fields stored as code values which need to be converted into their appropriate literal string values to match the values that are allowed by Laser Pro rules.

The Transaction Data 12 is organized in Prepare Transaction Data 14 to an intermediate format. This intermediate format is necessary to support conversion of data elements that do not have a one-to-one relationship with corresponding Laser Pro data elements. Status is Notified 16 of the upcoming Interaction with Laser Pro 18 in which the information will be transmitted to the Laser Pro system.

The Laser Pro system is then prepared for the interaction from the system by initializing the initial communication parameters, including the physical drive and path of the Laser Pro Server, the standard template which represents the type of document to be produced along with other information and properties. The Laser Pro Dynamic Lookup Library is also initiated. If this is the first time the transaction is communicated to Laser Pro, Laser Pro creates a new transaction for reference purposes during the transfer process. If the transaction was previously communicated to Laser Pro, Laser Pro retrieves the transaction and updates the previously communicated transaction. The system then updates, modifies and removes some of the default data from the Laser Pro transaction based on the Compare Transaction to Laser Pro Data 20.

After the update, modification and removal of the data, the Export to Laser Pro process then transmits the information to the Laser Pro system 22. The system then receives information from Laser Pro as a result of the communication to the third party system. At this point the system then traverses the data, Comparing 20 the transmitted data which is stored using a temporary storage facility with the original transaction data to see if the data is corrupt. The system Reports Differences 24 based on the comparison, the system then Notifies Status 26 and the user of differences between the two systems. If there are no differences, the user is given the option to have Laser Pro prepare the necessary documents.

Figure 23:
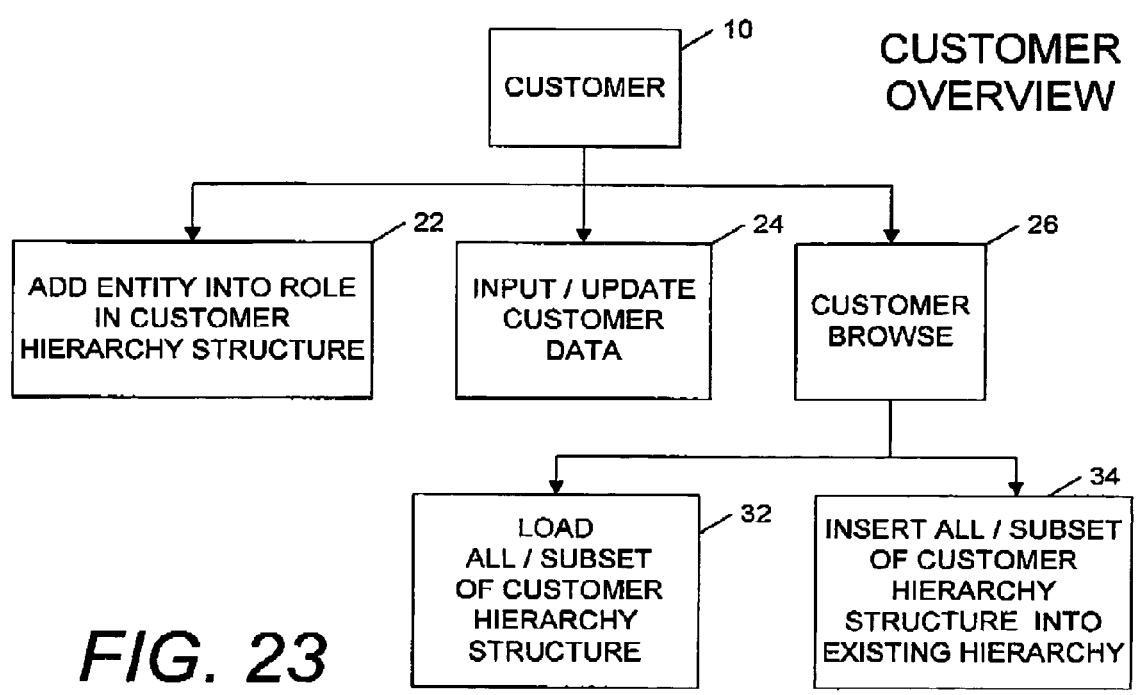
FIG. 23 is a block diagram of the Customer process within the transaction workflow and data collection system.

FIG. 23 illustrates the Customer process which provides the ability to input, edit, manage, store and retrieve the customer data. In addition, the Customer process supports integrating complex customer relationships and simplifies the input and management of nested roles. The customer database structure supports the ability to have for a single customer, multiple customer records, both active and inactive, with different version of customer data, each version current and distinct. To accomplish this the Customer Process stores data which represents the customer and the customer's hierarchy in a retrievable organization so that it can be retrieved by supplying a specific customer id which retrieves the entire customer hierarchy.

When the user invokes the Customer process, the system directs the user to the Customer summary screen 10. If the user supplies a transaction id, the customer data is retrieved using the supplied transaction id. Otherwise, the Customer screen 10 is organized by the customer hierarchy and displayed. At the Customer screen the user can chose to add a customer type 22, Add information about a current customer 24 or Browse the Customers 26 in the system.

If the user selects Add Entity into Role in Customer Hierarchy Structure 22, the customer detail screen is invoked where the user can add specific customer details including the entity type, the sub-entities or other information specific to the customer type entered.

Customer data is supported for all types of customers including individuals, businesses, government entities, associations and so forth. Updating a Customer Record 24 creates a new master record with the current transaction pointing to the new record. Existing pending transactions may optionally be updated to point to the new customer record or may preserve their link to the previous record. Historical transactions are undisturbed since they continue to point to previous records. If a customer record is deleted from a loan, sequence numbers are used to determine if there are any other references to the customer before permanently removing the customer record. These features are accomplished by using a sequence of numbers that establish unique references to each version of the master customer record.

If the user selects to Input/Update Customer Data 24, a Customer summary screen is retrieved and populated with customer specific information. The user then has the ability to modify the customer information including adding additional customer types for the customer. For example, using a Commercial Loan Transaction, the user can choose between Add Role, Add Guarantor or Add Co-Signor. If the user selects Add a Role, the customer hierarchy will be populated into an existing transaction using the additional role created for the selected customer. The system also allows the user to populate a customer hierarchy into another customer hierarchy on an existing transaction. If the user decides to remove a customer instead, all customer specific hierarchy will be removed from below the selected customer in the customer list.

Customer Browse 26 provides a search facility to locate a customer record or relationship structure to retrieve into a role on the current transaction. If the user selects the Browse function 26, the user can select the transaction to browse for customers, select which customer number to browse, customer name, or other search criteria selecting a customer to load from the transaction data. The system verifies that a customer role has been set, if no customer of that type is created then the user is instructed to first add a customer. If customers are present and match the search criteria, the user can configure the display results in Customer Browse 26. The user can either Load All or a Subset of the Customer Hierarchy Structure 32 or the user can Insert All or a Subset of Customer Hierarchy Structure 34 in the existing hierarchy. If the user decides to Load 32 the Customer Hierarchy, the user can decide to load the single customer record or the complete relationship record with or without subsets being loaded into the existing customer structure at the designated location, leaving the original customer id present on all records.

Figure 24:
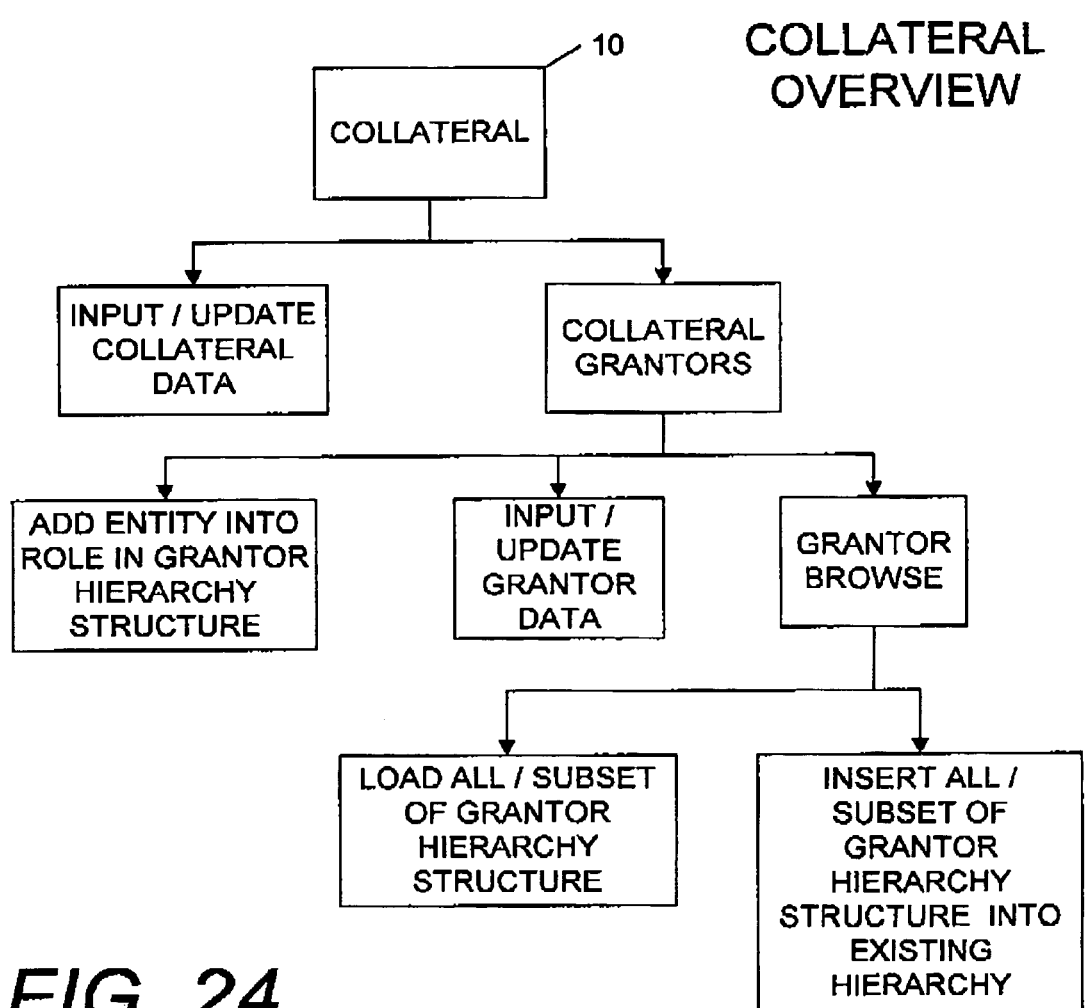
FIG. 24 is a block diagram of the Collateral process within the transaction workflow and data collection system.

FIG. 24 illustrates the Collateral Overview diagram. The collateral process is similar to the customer process described above, except that collateral may be specific to a financial transaction which may have collateral involved in the transaction. Collateral may be the item used to guaranty repayment on a loan transaction. In addition, a collateral item may be used on one loan or multiple loans with multiple parties associated with the collateral item. The collateral process provides the ability to input, edit, manage, store and retrieve collateral data including a wide variety of collateral types and associated data such as grantor, grantor hierarchy, collateral insurance and collateral grantors. The collateral browse facility provides the ability to search for and retrieve collateral data from a list of transactions, existing collateral within the system or customers. In addition, the data may be retrieved whereby the data is replicated, allowing the user the ability to modify the replicated data while maintaining the integrity of the original data. Information about collateral can be retrieved into the transaction along with its associated grantor structure information. This collateral item can be classified as the master or if the collateral is replicated, the replicated collateral may become the master data item. The Collateral database structure also supports the ability to have a single collateral item, multiple collateral records, both active an inactive with different version of collateral data, each version current and distinct.

As illustrated in FIG. 24, when the user invokes the Collateral process, providing the system loan data or a loan id, the collateral data is retrieved. Resident control data is accessed to enable lists, convert lookup codes to literal values, set default settings and other formatting and presentations functions. On the Collateral 10 screen, all current collateral within the transaction is displayed in the collateral list according to the display formatting. When the Collateral 10 Summary screen is displayed, the user may specify that the loan is unsecured, or may add new collateral items, edit or remove collateral already on the loan or browse system collateral data to retrieve a collateral item from the system loan data into the current transaction. If the user selects unsecured any collateral item already attached to the loan is deleted from the loan, disabling the remaining fields and functions on the Collateral Summary screen 10. If the user selects Add new collateral item the specified collateral type and sub-type are used to determine the correct collateral details screen invoking the collateral details screen with an add request. If the user selects edit, the collateral type and sub-type are used to determine the correct collateral details screen invoking the collateral details screen with an edit request with the specified collateral item. If the user selects Remove, the user is prompted to confirm the deletions. The system then retrieves the master collateral item and determines if there are any references to the collateral item. If there have been other references the system removes the collateral and all associated information from the transaction, otherwise the system removes the collateral item itself. The system then invokes the Customer process to delete any grantor information.

Having thus described the invention, what is claimed as new and desired to be secured by Letters Patent is:

1. A method for managing an institution's workflow and data collection during a transaction life-cycle, comprising the steps of:
   configuring system policies to match the institution's objectives; storing transaction data for a transaction on a retrievable storage media; comparing transaction data against the configured system policies;
   displaying current transaction data for a transaction as said transaction transitions through various workflow steps in a transaction life-cycle;
   processing a workflow for a transaction, comprising the steps of:
   identifying a transaction;
   deciding the appropriate transaction workflow step in a set of potentially affected workflow steps;
   executing a function on a workflow step;
   monitoring the status of each transaction in said set of potentially affected workflow steps; and
   determining, in response to said deciding step, said executing step and said monitoring step, a next step for each said workflow step in said set of potentially affected workflow steps in which said status changes from incomplete to ready;
   configuring the user profiles into a process hierarchy and a department hierarchy which reflects the institution's operational and organizational hierarchical structures;
   creating an approval policy for requiring certain transactions to obtain certain approval types;
   creating a legal review policy for requiring certain transactions to receive approval from a qualified user within the institution;
   creating a policy rules repository for the recording and customization of the institution business rules;
   developing document profiles which specify the characteristics of documents and said characteristics' timing within the transaction life-cycle; and
   creating a document rules repository for the generation of a document checklist; and configuring the institutional policies based upon the rules and regulations of the institution.

2. The method of claim 1 including the step of communicating the transaction data to third party systems.

3. The method of claim 1 wherein institution is selected from a group consisting of commercial institutions, governmental institutions, financial institutions, industrial institutions, health care institutions or governmental institutions.

4. The method of claim 1 wherein system policies further includes user profiles.

5. The method of claim 1 wherein said comparing step includes: is our or less retrieving stored transaction data, stored policies, approval policies, legal review policies and stored document policies and profiles;
   validating transaction data against transaction policies;
   producing a validation error list for recording the results from the validating step; displaying the validation error list;
   providing a mechanism for a user to navigate through the displayed error list;
   testing transaction data against document policies to determine which documents are relevant at a particular time;
   producing a document checklist for recording the relevant documents;
   recording document disposition;
   providing a refresh facility to refresh the document record facility in response to changes to the transaction data;
   providing a mechanism for a user to navigate through the displayed document checklist; providing a facility to record an approval or rejection from an authorized approver.

6. The method of claim 5 further including:
   developing a watch criteria to cause all transactions which meet the watch criteria to require approval from the legal review based upon the loan transaction data.

7. The method of claim 1 wherein the step of displaying includes:
   validating user's credentials;
   organizing various resources used by a valid usa; and
   displaying relevant operational information based upon users profile.

8. The method of claim 7 wherein the step of displaying includes: imposing a parent-child window structure;
   providing a navigationally interactive parent-child window structure; and
   customizing functional elements based on the users' profile.

9. The method of claim 1 wherein the step of storing includes:
   storing data consisting of more than one parameter representing a specific party to a transaction and said party's organizational hierarchy on a retrievable storage medium;
   storing data consisting of more than one parameter representing a specific collateral to a transaction on a retrievable storage medium;
   organizing the stored data in a manner which can be retrieved by comparing a parameter within the data with a user supplied parameter;
   supplying a parameter to retrieve stored data;
   displaying data on a graphical user interface screen organized by the business entity hierarchy;
   selecting a customer on the graphical user interface screen, including its said customer's entity hierarchy; and
   populating the selected entity hierarchy into an existing transaction.

10. The method of claim 9 wherein the step of populating further includes:
    populating the selected entity hierarchy into an existing customer hierarchy on an existing transaction.

11. The method of claim 9 further including:
    retrieving stored collateral data whereby the user selects the collateral from a list of collateral;
    modifying the retrieved data whereby the data is replicating to allow the user to modify the replicated data maintaining the integrity of the original data;
    classifying the replicated data as the master data for a particular item of collateral; entering additional data relevant to the replicated instance of the retrieved data; and storing data on a retrievable storage medinro whereby it can be retrieved by comparing a parameter within the data with a user supplied parameter.

* * * * *